(12) United States Patent
Choi-Grogan et al.

(10) Patent No.: US 8,498,267 B2
(45) Date of Patent: Jul. 30, 2013

(54) ACCESS CONTROL FOR MACROCELL TO FEMTOCELL HANDOVER

(75) Inventors: Yung Shirley Choi-Grogan, Issaquah, WA (US); Arthur Richard Brisebois, Cumming, GA (US); Kurt Donald Huber, Coral Springs, FL (US)

(73) Assignee: AT&T Mobility II LLC, Atlanta, GA (US)

( * ) Notice: Subject to any disclaimer, the term of this patent is extended or adjusted under 35 U.S.C. 154(b) by 727 days.

(21) Appl. No.: 12/434,211

(22) Filed: May 1, 2009

(65) Prior Publication Data

US 2010/0278141 A1 Nov. 4, 2010

(51) Int. Cl.
*H04W 4/00* (2009.01)
(52) U.S. Cl.
USPC ............ 370/331; 370/338; 370/341; 370/348
(58) Field of Classification Search
USPC .......... 370/328, 329, 331, 332, 341; 455/437, 455/438, 406, 436, 456.1; 709/203; 342/357.1
See application file for complete search history.

(56) References Cited

U.S. PATENT DOCUMENTS

| | | | | |
|---|---|---|---|---|
| 2005/0122259 | A1* | 6/2005 | Sairo et al. ................. | 342/357.1 |
| 2008/0032706 | A1* | 2/2008 | Sheynblat et al. ......... | 455/456.1 |
| 2008/0132239 | A1* | 6/2008 | Khetawat et al. ............ | 455/438 |
| 2009/0003282 | A1* | 1/2009 | Meylan et al. ................ | 370/331 |
| 2009/0005043 | A1* | 1/2009 | Claussen et al. ............. | 455/436 |
| 2009/0176479 | A1* | 7/2009 | Vikberg et al. ............... | 455/406 |
| 2009/0219888 | A1* | 9/2009 | Chen et al. .................... | 370/331 |
| 2009/0319605 | A1* | 12/2009 | Wirola et al. ................. | 709/203 |
| 2010/0113032 | A1* | 5/2010 | Lee et al. ...................... | 455/437 |

OTHER PUBLICATIONS

3rd Generation Partnership Project; Technical Specification Group GSM/EDGE Radio Access Network; Radio subsystem synchronization (Release 8) http://www.3gpp.org/ftp/Specs/html-info/45010.htm last viewed Jul. 31, 2009, 4 pages.
3rd Generation Partnership Project; Technical Specification Group Radio Access Network; UTRAN Iub interface Node B Application Part (NBAP) signalling (Release 8) S:\HAM\ATTW\P204US\IDS 7-31-09\3GPP specification 45_010.mht last viewed Jul. 31, 2009, 2 pages.

\* cited by examiner

*Primary Examiner* — Hassan Kizou
*Assistant Examiner* — Toan Nguyen
(74) *Attorney, Agent, or Firm* — Turocy & Watson, LLP

(57) ABSTRACT

System(s) and method(s) are provided to control access to a femtocell as part of handover of a mobile device from macrocell to femtocell. Macro network platform issues a handover (HO) request towards femto network platform and a single virtual femto node, which represents a plurality of femto access points (APs). Location estimate(s) for the mobile device drives selection of a target femto AP. Selection of the target AP results in acceptance of the HO request. The mobile device also can request macro-to-femto (MTF) handover. HO neighbor list(s) is generated by decoding a network-issued identifier for each femto APs in a set of femtocells, and selectively ranking each femto AP based at least on channel quality; access privileges of the mobile device to each of the identified femto APs determines selectivity. Validation of mobile device's access right(s) drives acceptance of the MTF HO request to a top ranked femto AP.

38 Claims, 15 Drawing Sheets

ACCESS CONTROL FOR MACROCELL TO FEMTOCELL HANDOVER

TECHNICAL FIELD

The subject innovation relates to wireless communications and, more particularly, to controlling handover from macrocell to femtocell.

BACKGROUND

Indoor coverage is a primary differentiator among wireless service provider, yet an indoor-environment is not conducive to efficient utilization of radio resources because of various factors such as path loss or attenuation, which can lead to channel quality degradation and ensuing excessive signaling which in turn can increase battery drain substantially for mobile devices operating within the indoor environment. In addition, as wireless service become ubiquitous and thus commoditized, market share of legacy telecommunication systems and service associated therewith are increasingly affected by customer attrition. Thus, various solutions such as microcells, picocells, repeaters, and femtocells have emerged to exploit legacy systems and extant broadband, non-mobile networks to provide indoor coverage.

Such solutions, particularly femtocell coverage, are likely to overlap with extant macrocell coverage to ensure service continuity as subscriber(s) enters in and exits out of the subscriber(s) home coverage area or private indoor environment. It is noted that while disparate solutions such as microcells also overlapped with macro coverage, each microcell required unique identifiers and handover relationships or associations with the underlaid macrocell sector. Yet, microcells are typically few due to cost factors limiting them to commercial applications only. In turn, femtocells are consumer products with a significant commoditization factor, e.g., low-threshold to market adoption and rapid decay or adjustment of pricing setpoints; thus, femtocell deployments are projected to be far more numerous that microcell solution(s). A substantive number, e.g., $10^2$-$10^5$, of femtocells can reside within the wireless coverage area of a single macrocell thus creating a substantively complex handover situation for transitioning from macrocell coverage to femtocell coverage. In view of such high deployment density, handover from macrocell-to-femtocell can readily strain conventional neighbor-handling capabilities such as handover associations of macrocell networks and devices or other solutions for wireless indoor coverage.

With respect to wireless network operation and handover, conventionally, public land mobile network (PLMN) and associated mobile country code (MCC) and mobile network code (MNC) or network color code(s) (NCC(s)) are employed to determine if a mobile device is allowed to access a macrocell. However, conventional systems do not contemplate dedicated network mask code(s) that distinguishes a "public" macrocell network from a "private" femtocell network wherein a limited number of customers can access service and related radio resources in each femto access point. Conventional network operators can deploy a femto network within the same MNC and MCC network as a macro network. Accordingly, conventional systems can experience inefficient macro-to-femto handover especially in the high-density limit, e.g., $10^5$-$10^6$ femtocells per macrocell that is expected in long-term deployments.

SUMMARY

The following presents a simplified summary of the innovation in order to provide a basic understanding of some aspects of the innovation. This summary is not an extensive overview of the invention. It is intended to neither identify key or critical elements of the innovation nor delineate the scope of the innovation. Its sole purpose is to present some concepts of the invention in a simplified form as a prelude to the more detailed description that is presented later.

The subject innovation provides system(s) and method(s) to control access to a femtocell as part of handover of a mobile device from macrocell to femtocell, or macro-to-femto (MTF) handover. A macro network platform issues a handover (HO) request towards a femto network platform and a single virtual femto node, which represents a plurality of femto access points (APs). The virtual femto node is a logical structure that can represent various femtocells based at least in part on identifier(s) for the femto APs and capability of a mobile device to decode such identifier(s) as part of MTF HO procedure(s). It is noted that at least one advantage of representation of femtocells through virtual femto node(s) is the substantive reduction of the number of macro-to-femto relationships or associations that are necessary as part of MTF handover.

In an aspect, location estimate(s) for the mobile device drives selection of a target femto AP, wherein the location estimate(s) can be based at least in part on at least one of network-requested global navigation satellite system (GNSS)-based measurements and triangulation conducted by the mobile device, or time-of-flight measurements of wireless signal(s) propagation timing conducted by the macro network platform. Femto network platform, or one or more components thereof, can select the target femto AP based at least in part on a proximity metric or range (e.g., nearest femto AP) to the mobile device, with the selected target femto AP located within a predetermined range from the mobile device. Upon selection of the target femto AP, femto network platform, or one or more components thereof, can verify through an access list liked to the target femto AP whether the mobile device, or a unique identifier thereof, is allowed to access the selected target femto AP. When the mobile device, or the unique identifier thereof, in authorized or included in the access list, the HO request is accepted or allowed and the selected target femto AP is prepared for MTF handover. Conversely, the femto network platform, or the one or more components therein, reject the MTF HO request.

The mobile device also can request macro-to-femto (MTF) handover. The mobile device can generate HO neighbor list(s) in accordance at least with decoding a network-issued unique identifier for each femto AP in a set of femtocells, and selectively ranking each femto AP based at least in part on channel quality associated therewith. Selectivity arises from access privileges of the mobile device to each of the identified femto APs linked at least in part to the unique identifier(s) of the femto APs and unique identifier(s) for the mobile device. Access privileges, or rights, can be linked to the unique identifier(s) of the mobile device via access list(s) configured at least in part through a femto network platform or one or more component therein. Unique identifier(s) for the mobile device can be extracted as part of attachment procedures of the mobile device to a serving macrocell. The mobile device generates channel quality metrics for femto APs to which it is authorized to access service, thus mitigating signaling with respect to HO attempts to non-allowed femto APs or processing related to generating channel quality for the non-allowed femto APs. Validation of mobile device's access right(s) drives acceptance of the MTF HO request and preparation of a top ranked target femto AP for handover.

Aspects, features, or advantages of the subject innovation can be exploited in substantially any wireless telecommunication, or radio, technology; for example, Wi-Fi, Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP UMTS; High Speed Packet Access (HSPA); High Speed Downlink Packet Access (HSDPA); High Speed Uplink Packet Access (HSUPA), or LTE Advanced. Additionally, substantially all aspects of the subject innovation can include legacy telecommunication technologies.

It is noted that various aspects, features, or advantages of the subject innovation are illustrated in connection with femto access point(s) and associated femto network platform, such aspects or features also can be exploited in indoor-based base stations (e.g., home-based access point(s), enterprise-based access point(s)) that provide wireless coverage through substantially any, or any, disparate telecommunication technologies such as for example Wi-Fi (wireless fidelity) or picocell telecommunication.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
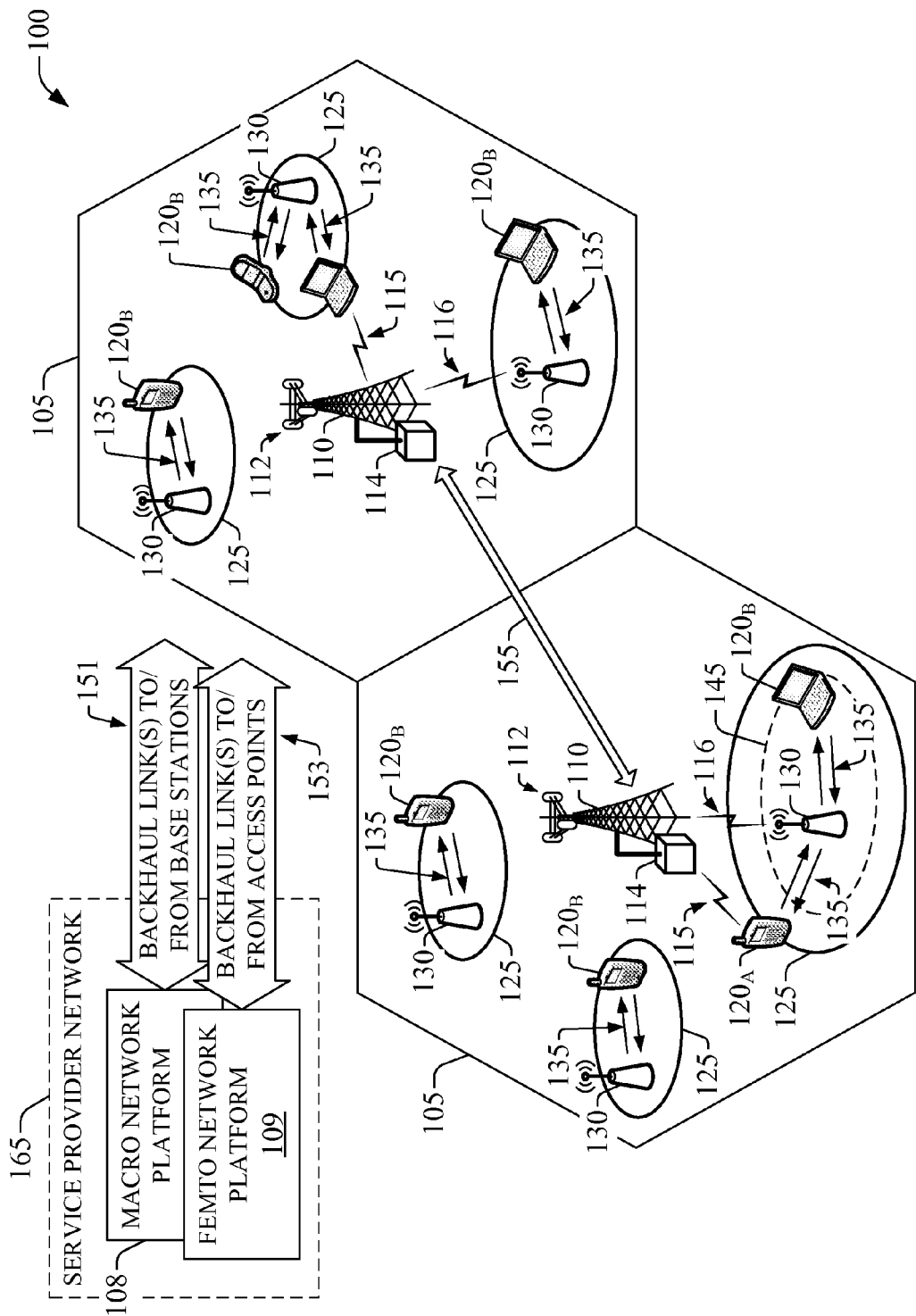
FIG. 1 illustrates a schematic deployment of a macrocells and femtocells for wireless coverage, wherein macro-to-femto (MTF) handover and related access to femtocell(s) is controlled in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the present innovation. It may be evident, however, that the present invention may be practiced without these specific details. In other instances, well-known structures and devices are shown in block diagram form in order to facilitate describing the present invention.

As used in this application, the terms "component," "system," "platform," "interface," "node," "selector," "generator" "layer," "module" and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B (eNode B)," home Node B (HNB)," "home access point (HAP)," or the like, are utilized interchangeably in the subject specification and drawings, and refer to a wireless network component or apparatus that serves and receives data, control, voice, video, sound, gaming, or substantially any data-stream or signaling-stream from a set of subscriber stations. It is noted that in the subject specification and drawing, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

Referring to the drawings, FIG. 1 illustrates a wireless environment that includes macro cells and femtocells for wireless coverage in accordance with aspects described herein. In wireless environment 100, two areas 105 represent "macro" cell coverage, each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in outdoors locations. An over-the-air wireless link 115 provides such coverage, the wireless link 115 comprises a downlink (DL) and an uplink (UL), and utilizes a predetermined band, licensed or unlicensed, of the radio frequency (RF) spectrum. As an example, UE $120_A$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 108 controls a set of base stations 110 that serve either respective cells or a number of sectors within such cells. Base station 110 comprises radio equipment 114 for operation in one or more radio technologies, and a set of antennas 112 (e.g., smart antennas, microwave antennas, satellite dish(es) . . . ) that can serve one or more sectors within a macro cell 105. It is noted that a set of radio network control node(s), which can be a part of macro network platform; a set of base stations (e.g., Node B 110) that serve a set of macro cells 105; electronics, circuitry or components associated with the base stations in the set of base stations; a set of respective OTA wireless links (e.g., links 115 or 116) operated in accordance to a radio technology through the base stations; and backhaul link(s) 155 and 151 form a macro radio access network (RAN). Macro network platform 108 also communicates with other base stations (not shown) that serve other cells (not shown). Backhaul link(s) 151 or 153 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 155 link disparate base stations 110.

In wireless environment 100, within one or more macro cell(s) 105, a set of femtocells 125 served by respective femto access points (APs) 130 can be deployed. While in illustrative wireless environment 100 three femtocells are deployed per macro cell, aspects of the subject innovation are geared to femtocell deployments with substantive femto AP density, e.g., $10^4$-$10^7$ femto APs 130 per base station 110. A femtocell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station $120_B$) within confined coverage area 125 via a wireless link 135 which encompasses a downlink (DL) and an uplink (UL). Femto AP 130 can receive signal from a base station 110 through wireless link 110. A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject innovation, part of the control effected by femto AP 130 measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as 120$_A$ is substantially straightforward and seamless when handover from femto-to-macro, or vice versa, takes place. As an example, femto AP 130 can integrate into an existing 3GPP Core Network via conventional interfaces, or reference links, like Iu-CS, Iu-PS, Gi, Gn.

It is to be noted that substantially all voice or data active sessions associated with subscribers within femtocell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has a LAC (location area code) and RAC (routing area code) that is different from the underlying macro network. These LAC and RAC are used to identify subscriber station location for a variety of reasons, most notably to direct incoming voice and data traffic to appropriate paging transmitters, and emergency calls as well. As a subscriber station (e.g., UE 120$_A$) that exploits macro coverage (e.g., cell 105) enters femto coverage (e.g., area 125), the subscriber station (e.g., UE 120$_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). Attachment attempts are a part of procedures to ensure mobility, so voice calls and data sessions can be established and retained even after a macro-to-femto transition or vice versa. It is to be noted that UE 120$_A$ can be employed seamlessly after either of the foregoing transitions. In addition, femto networks typically are designed to serve stationary or slow-moving traffic with reduced signaling loads compared to macro networks. A femto service provider network 165 (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femtocell operation. Conversely, if not successful, UE 120$_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE 120$_A$ is allowed on femtocell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a back-haul broadband wired network backbone 140 (e.g., optical fiber backbone, twisted-pair line, T1/E1 phone line, digital subscriber line (DSL) either synchronous or asynchronous, an asymmetric DSL, a coaxial cable . . . ). To at least this end, femto AP 130 is typically connected to the broadband backhaul network backbone 140 via a broadband modem (not shown). In an aspect of the subject innovation, femto AP 130 can display status indicators for power; active broadband/DSL connection; or any other type of backhaul connectivity; gateway connection; and generic or specific malfunction. In another aspect, no landline is necessary for femto AP 130 operation.

Figure 2:
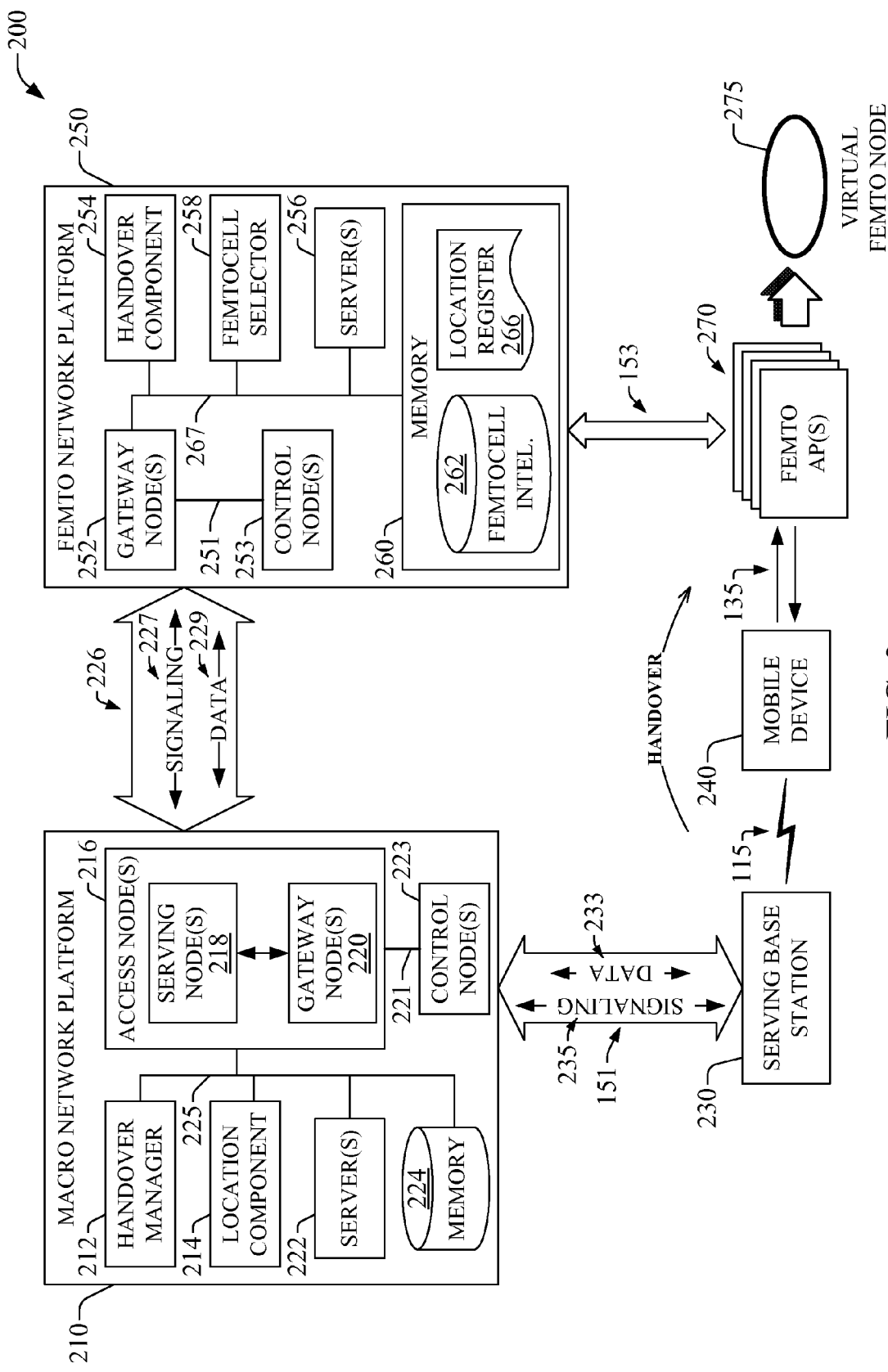
FIG. 2 is a block diagram of an example system that enables macro-to-femto handover in accordance with aspects described herein.

FIG. 2 is a block diagram of an example system 200 that enables macro-to-femto (MTF) handover in accordance with aspects described herein. In preparation for MTF handover, mobile device 240 can generate a HO neighbor list and format the list as a singleton set with an entry associated with a single virtual femto node 275. The virtual femto node 275 is a logic structure that can represent an almost arbitrary number of femto AP(s) 270; as an example, a set of $10^2$-$10^3$ femto APs can be logically consolidated into a single virtual femto node 275. In an aspect, to generate the HO neighbor list, mobile device 240 measures pilot signal(s) from a set of femto APs, e.g., femto AP(s) 270, and consolidates the various measured femtocells into the single virtual femto node. It should be appreciated that consolidation of measured set of femto APs into a single virtual femto node reduces the relationship(s) between the mobile device 240 and femto APs to a single association irrespective of femtocell density. In addition, grouping the set of measured APs into a single virtual node reduces processing and ensuing complexity at mobile device 240 since decoding identity of measured femto APs can be avoided. The latter provides at least the advantage of enabling MTF HO of conventional and legacy mobile devices that can scan a wireless environment. Since coverage of a femtocell and associated femto AP is confined to an area significantly smaller that the area of a macro cell or sector (see FIG. 3 for an illustration), detected pilot signal(s) originates primarily from femto APs near mobile device 240. Accordingly, mobile device 240 can be assigned to handoff to a physical femto AP that serves a current location of the mobile device 240.

Mobile device 240 can convey the HO neighbor list with the single virtual femto node entry through wireless link 115 to serving base station 230, which can relay the HO neighbor list to macro network platform 210 via data 233 or signaling 235 transported through backhaul link(s) 151. Within macro cell network platform 210, delivery of HO neighbor list to handover manager component 212 can proceed through control node(s) 223, which can convey the HO neighbor list to serving node(s) 218 for further relay to gateway node(s) 220 and subsequent communication to handover manager 212. Control node(s) 223 can be functionally connected to access node(s) 216 through a reference link or reference interface 221. It is noted that, in an aspect, control node(s) 223 can be deployed in disparate locations in the field and mutually connected through backhaul pipes. In 3GPP UMTS, control node(s) are embodied in radio network controller(s). In another aspect, control node(s) 223 can reside at least in part within macro base stations, as it is the case in 3GPP LTE technology. It should be appreciated that macro network platform can include various technology layer(s) or classes of deployments and thus control node(s) 223 include disparate types of nodes.

Handover manager component 212, also herein referred to as handover manager 212, receives, as described above, the handover (HO) neighbor list with a single entry for the single virtual femto node, and can generate a network-initiated HO request towards femto network platform 250 and the received single virtual femto node. The network-initiated HO request can be conveyed as part of signaling 227 and can be embodied in at least one of a short message service (SMS) communication, a multimedia messaging service (MMS) communication, an unstructured supplementary service data (USSD) message, or in one or more bits in at least one of control channel(s), data packet header(s), management frame(s), or management packet(s). It is noted that the request can be control-node-to-control-node request, e.g., an IuR HO request in the case of a 3GPP UMTS architecture.

In femto network platform 250, control node(s) 253 can receive the HO request and relay it to handover component 254 via gateway node(s) 252, and through reference link 251. Alternatively, the control node within control node(s) 223 that administers service base station 230 can convey the HO request to access node(s) 216 which can relay it to gateway node(s) 252 so the HO request is conveyed to handover component 254 there from. As discussed above, a physical femto AP to which mobile device 240 can be handed over is likely to reside in the vicinity of a current location of the mobile device 240. Thus, in an aspect of the subject innovation, handover component 254 can collect location estimate(s) of mobile device 240 in response to the received HO request. In an aspect, an indication to collect location data for the mobile device is signaled to macro network platform 210 via signaling 227. The indication can be embodied in at least one of a SMS communication, a MMS communication, a USSD communication, or one or more bits in at least one of control channel(s), data packet header(s), management frame(s), or management packet(s). Through access node(s) 216, location component 214 can receive the indication to collect location data and, based at least in part on functional capabilities of or enabled services for mobile device 240, it can supply location estimates based on at least one of GNSS-based measurements or time-of-flight measurements. In the case mobile device 240 is enabled for GNSS service, e.g., mobile device 240 can receive GNSS timing messages and time-stamp such messages, and implement a triangulation algorithm, location component 214 can deliver a request for a GNSS-based location estimate to the mobile device 240 and receive such location estimate in response to the request. It is noted that when mobile device 240 is unable to collect sufficient timing messages, or GNSS fixes, to generate a location estimate due to poor satellite visibility, location component 214 can provide timing messages to mobile device 240. Location component 214 can deliver the received location estimate, which can be received as part of data 233 through control node(s) 223 and access node(s) 216, to handover component 254—gateway node(s) 252 can receive the location estimate as part of data 229 and relay it to handover component 254. In an aspect, location component 214 can exploit information retained in a subscriber database (not shown) that can be part of memory 224 to determine whether mobile device 240 is GNSS-capable or it has GNSS service enabled. Alternatively or additionally, in another aspect, location component 214 can query mobile device 240 for location data to which in response mobile device 240 can supply a location estimate or deliver a notification that location data service(s) are disabled.

In case mobile device 240 is not GNSS-capable or GNSS service is not enabled therein, location component 214 can initiate TOF measurements and receive data associated therewith to generate, or resolve, a location estimate for mobile device 240. Location component 214, through access node(s) 216, can deliver the location estimate to handover component 254—gateway node(s) 252 can receive the location estimate and relay to handover component 254. TOF measurements assess wireless signal propagation timing between a base station such as service base station 230 and mobile device 240, and can include at least one of round trip time (RTT) measurements, time or arrival (TOA), time difference of arrival (TDOA), angle of arrival (AOA), or the like. Location component 214 can utilize timing measurements to resolve a current location estimate for mobile device 240.

As part of access control and related MTF handover, received location estimate(s) for mobile device 240 can be conveyed to femtocell selector 258 which can compare the location estimate(s) with location records of femto APs and associated coverage areas. Femtocell selector 258 can identify a femto AP that is located within a predetermined, configurable range from mobile device 240, as revealed by the received location estimate, and supply such selection of femto AP to handover component 254. In response to the received selected femto AP, handover component 254 can perform at least one of the following. (a) Verify through an access list liked to the target femto AP whether the mobile device, or a unique identifier thereof, is allowed to access the selected target femto AP. (b) Accept the MTF handover request when the mobile device is included in an access list for the selected femto AP. In an aspect, the access list can be included in femtocell intelligence 262. It is noted that an access list regulates privilege(s) or right(s) of user equipment to receive service through a femto AP. (c) Configure a user data routing path between a control node within control node(s) 253 that can transport data and signaling to the selected femto AP and the selected femto AP, such configuration can include activation of a packet data protocol (PDP) context for the selected femto AP. (d) Command the selected femto AP to prepare for the incoming handover, wherein preparation can include at least one of reception and retention of data directed towards mobile device 240, reallocation or reservation of radio resources such as bandwidth, adjustment of semi-persistent scheduling parameters, configuration of at least one transceiver and associated communication circuitry to operate in radio technology in which mobile device 240 operates, or temporary augmentation of pilot signal(s) transmitted power so as to increase femto coverage area outside an intended confined space to increase likelihood of successful attachment by mobile device 240.

It is noted that location records can include at least one of a geocode; a ZIP code; a street address; or a longitude, latitude and altitude. In an aspect, femtocell selector 258 can map received location estimate(s) to location record(s) to ensure integrity of the determination of location of a femto AP; for instance, if a received estimate includes latitude and longitude, femtocell selector 258 can map such estimate to a street address. Location of a femto AP can be collected, for example, at the time of provisioning the femto AP for service. Location records can be retained in location register 266, which can be embodied at least in part in at least one of a subscriber database (e.g., home subscriber server), a provisioning database that includes a femtocell identifier such as a service area code (SAC) (see below), or an external location intelligence repository such as a location based service or a home subscriber service.

Additionally, it is noted that in high-density deployment scenarios for femtocells, TOF-based estimates can provide a broad spatial range of locations for mobile device 240; for instance, TOF-based estimates that include range from serving base station can provide a location band or location fringe that can range from 50 m to 500 m in width, based at least in part on clock sources that determine, for example, chip time span, and extend throughout a radial zone surrounding the serving base station. It is noted that when TOF-based location estimates include azimuth confinement, e.g., an angular interval is also estimated as part of the TOF-based location estimate, spatial resolution can remain sufficiently coarse so as to include a plurality of femto APs that lay within the predetermined range from the mobile device 240 as provided by the location estimate. In such scenarios, femtocell intelligence 262 can provide a differentiator, e.g., a datum or information, that enables successful identification of a satisfactory or optimal femto AP candidate for MTF HO. For instance, femtocell intelligence 262 can include an association between a unique identifier of mobile device 240 and the residential address of a subscriber that owns or leases a femto AP.

Upon acceptance of the HO request, handover component 254 can deliver a HO acceptance indication to macro network platform 210 trough signaling 227 via link(s) 226, which can include reference link(s) or conventional interface(s) or link(s); access node(s) 216 can receive the indication and relay it to handover manager 212. The indication can be embodied in at least one of a SMS communication, an MMS communication, a USSD message, or in one or more bits in at least one of control channel(s), data packet header(s), management frame(s), or management packet(s). Handover manager 212, in response to the acceptance indication, can command mobile device 240 to handover to the reported virtual femto node; the directive to handover can include an identification, e.g., pilot code sequence index or pilot sequence hypothesis, of the selected physical femto AP, wherein mobile device 240 can utilize such identification to encounter the selected, optimal physical femto AP. In addition, handover manager 212 can route data directed to mobile device 240 to gateway node(s) 252 which can relay the data to a control node, part of control node(s) 253 that transport data to the optimal femto AP selected for macro-to-femto (MTF) handover. When the MTF handover is complete, mobile device 240 is attached to the selected femto AP and receives data through the routing data path, e.g., PDP context, configured by handover component 254.

In macro network platform 210, server(s) 222 include at least one of a processor, a memory, and a bus architecture, and can be functionally connected to each component in macro network platform 210. Server(s) 222 can confer, at least in part, the described functionality of each of such components and components therein. Server(s) 222 can connect to the components within macro network platform 210 through bus 225 for data or any other information exchange; bus 225 can be embodied in at least one of a memory bus, a system bus, an address bus, or one or more reference link(s) or interface(s). Additionally or alternatively, server(s) 222 can execute one or more of the components included within macro network platform 210. Moreover, or as another alternative, one or more components that comprise macro network platform 210 can reside within server(s) 222. Server(s) 222 can execute, e.g., through the at least one processor therein, code instructions (not shown) stored in a memory, e.g., memory 224, to provide at least in part the functionality of one or more of the components that reside within macro network platform 210.

Memory 224 can be a memory within server(s) 222 or an external memory such as a memory platform in external network(s) (e.g., IP multimedia subsystem, network operations center local are network . . . ) operationally coupled to the femto network platform 250.

Similarly, server(s) 256 include at least one of a processor, a memory, and a bus architecture, and can be functionally connected to each component in femto network platform 250. Server(s) 256 can confer, at least in part, the described functionality of each of such components and components therein. Server(s) 256 can connect to each of the components within femto network platform 250 through bus 267 for data or any other information exchange; bus 267 can be embodied in at least one of a memory bus, a system bus, an address bus, or one or more reference link(s) or interface(s). Additionally or alternatively, server(s) 256 can execute one or more of the components included within femto network platform 250. Moreover, or as another alternative, one or more components that comprise femto network platform 250 can reside within server(s) 256. Server(s) 256 can execute, e.g., through the at least one processor therein, code instructions such as software or firmware application(s), stored in a memory, e.g., memory 260, to provide at least in part the functionality of one or more of the components that reside within femto network platform 250.

Memory 260 can be a memory within server(s) 256 or an external memory such as a memory platform in external network(s) (e.g., IP multimedia subsystem, network operations center local are network . . . ) operationally coupled to the femto network platform 250.

Figure 3:
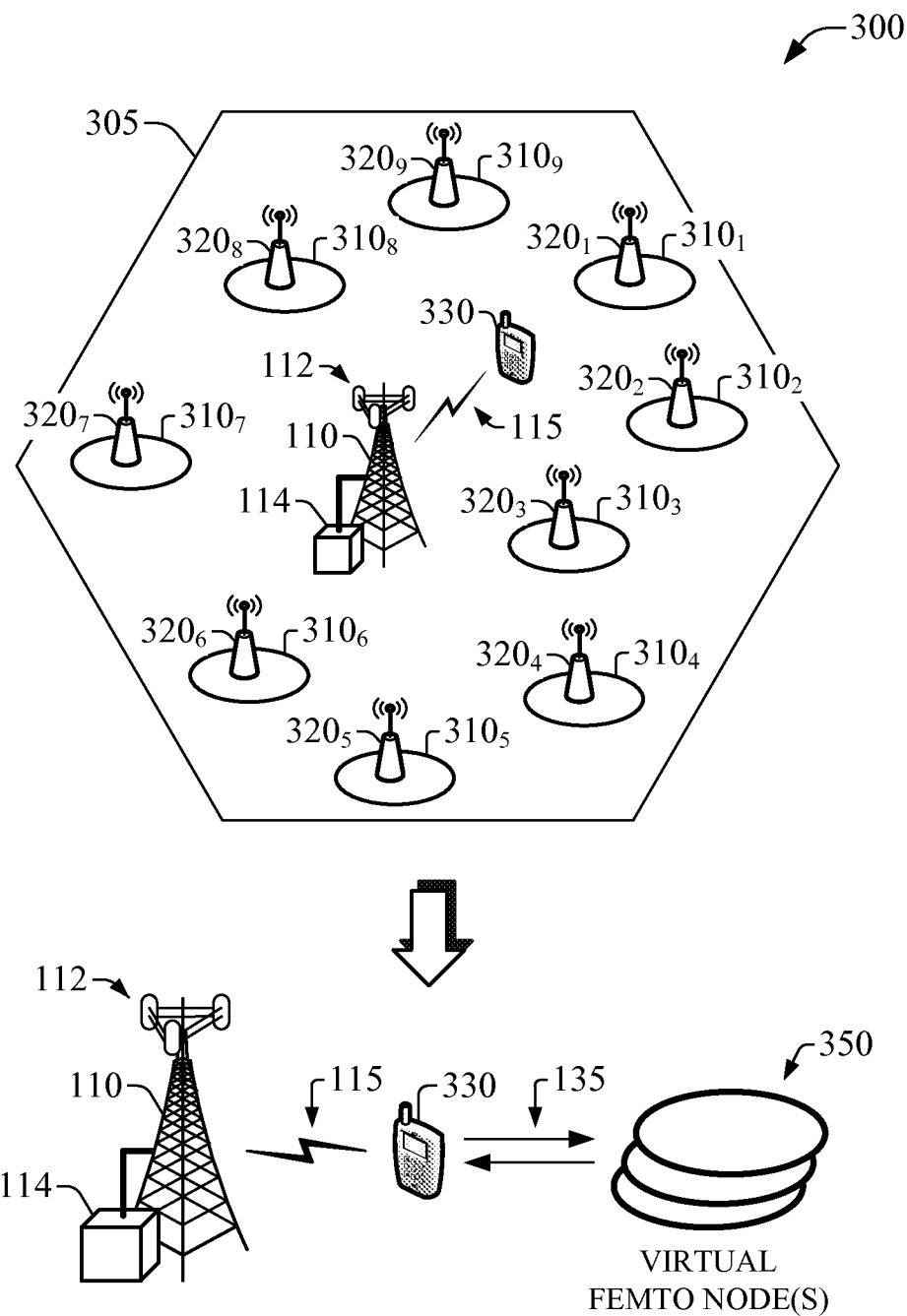
FIG. 3 is a diagram that illustrates an example mapping of a set of femto cells deployed within a macrocell to a set of femto virtual nodes in accordance with aspects described herein.

FIG. 3 is a diagram 300 that illustrates an example mapping of a set of femto cells deployed within a macro cell to a set of femto virtual nodes in accordance with aspects described herein. In the example mapping, a set of ten femto cells $310_1$-$310_{10}$ served via femto APs $320_1$-$320_{10}$ and deployed in a macro cell 305 served through base station 110 are mapped to three virtual femto nodes 350. It should be appreciated that the number $N_{AP}$ (an integer) of femto APs deployed in a single macrocell (e.g., 305) or single sector therein can range from $10^2$-$10^4$ femto APs. In a realization, mapping can be dictated at least in part by sector identifier so as to map femto APs deployed within a sector to a single virtual femto node; for instance one of the nodes 350 can include femto APs $320_9$, $320_8$, and $320_7$. In another realization, all femtocells within a macro cell can be mapped to a single virtual femto node. In yet another realization a physical-to-virtual mapping can associate all or substantially all femto APs configured to provide service to a mobile device 330 with a single virtual femto node. In such scenario, mappings are dynamic, with each mobile device served through macro coverage exposed to a unique virtual mapping. It should be appreciated that a mapping of femto APs to virtual femto nodes is at least (i) extensible in that additional femto APs can be included in a specific virtual node, and (ii) dynamic, with one or more physical femto APs added or removed based at least in part on configurable criteria such as sector ID, macro cell ID, provisioned address for the one or more femto APs, or the like. As described herein, femto virtual nodes can mitigate signaling, e.g., signaling 235 or 227, associated with handover from macro to femto coverage. A mobile device 330 can communicate with base station 110 via wireless link 115, and it can communicate through wireless link 135 the set of virtual femto nodes.

Figure 4:
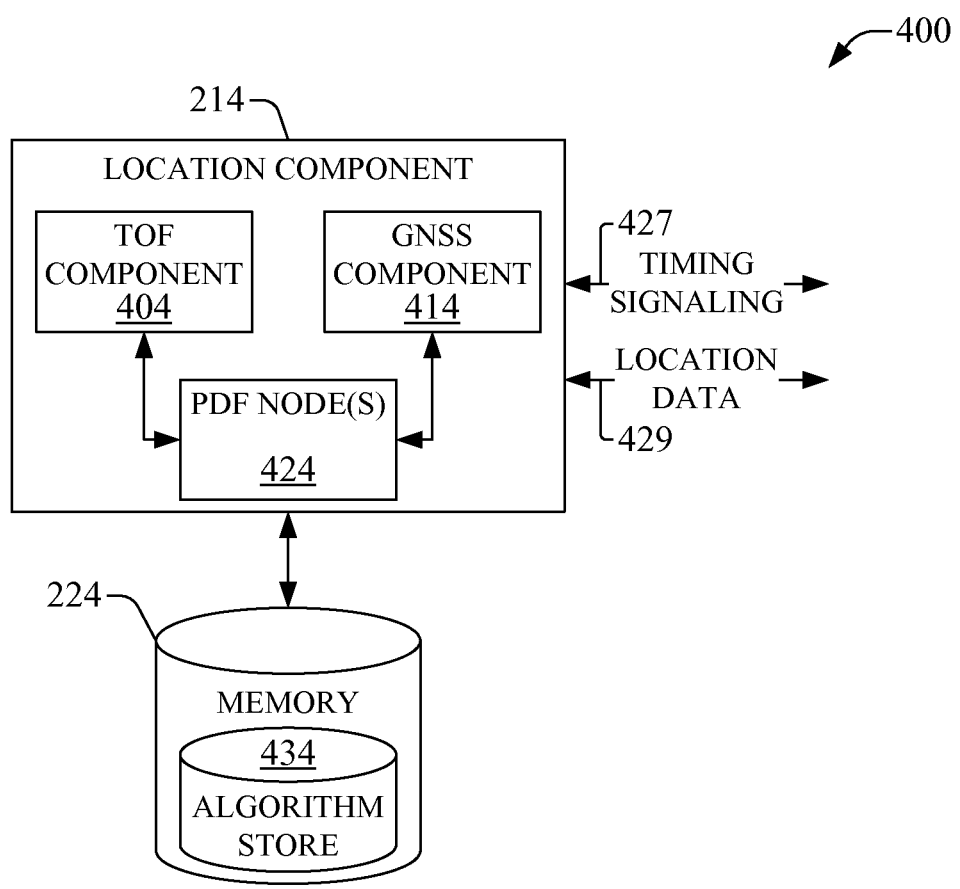
FIG. 4 displays a block diagram of an example embodiment of a location component that enables at least in part MTF handover in accordance with aspects disclosed herein.

FIG. 4 displays a block diagram of an example embodiment 400 of a location component 214 in accordance with aspects disclosed herein. Location component 214 includes a time-of-flight component 424 that can implement measurements of wireless signal propagation timing between a base station (e.g., Node B 110) and a mobile device (e.g., device 240). Propagation timing can be assessed through various TOF metrics that include at least one of round trip time (RTT), time of arrival (TOA), time difference of arrival (TDOA), or angle of arrival (AOA). TOF metrics can be determined for FL reference signal(s) or RL sounding signal(s). TOF component 404 can determine which type of pilot signal(s) to employ; in an aspect, such determination can be based at least in part on at least one of channel quality or radio technology utilized for communication by the mobile device. Position determination function node(s) 428 can enable extraction of a location estimate through a TOF metric in combination with a cell identifier (e.g., a cell global identifier (CGI)) or a sector identifier. It is noted that at least a portion of TOF component 404 can be distributed in the base station, e.g., as part of radio element(s) 114 to mitigate at least in part path delay offsets that may affect TOF estimates.

Additionally, location component 214 can include a global navigation satellite system (GNSS) component 424 to generate, at least in part, a location estimate for the mobile device position. GNSS component 414 can exploit PDF node(s) 424 to generate such location estimate. In an aspect, GNSS component 414 can deliver timing messages, e.g., a global positioning system (GPS) fix, to the mobile device (e.g., device 240) to assist it with determination of a location estimate such as latitude, longitude, or altitude.

Location component 214, and component and node(s) therein, can exploit algorithm(s) in algorithm store 434, which when implemented, e.g., executed by a processor, can afford to generate a location estimate or consume location data, wherein consumption can include propagation through network elements, delivery to location services, or delivery to external networks such as law enforcement networks. It is noted that for GNSS-based location estimates, algorithm(s) can include one or more communication protocols that enable communication of timing messages and received location data 429. For TOF location estimates, based at least in part on at least one of received timing signaling 427 or generated timing data, algorithm(s) can allow generation of range estimates or angular position estimates within a served area with respect to the centerline between the base station and the mobile device.

Figure 5:
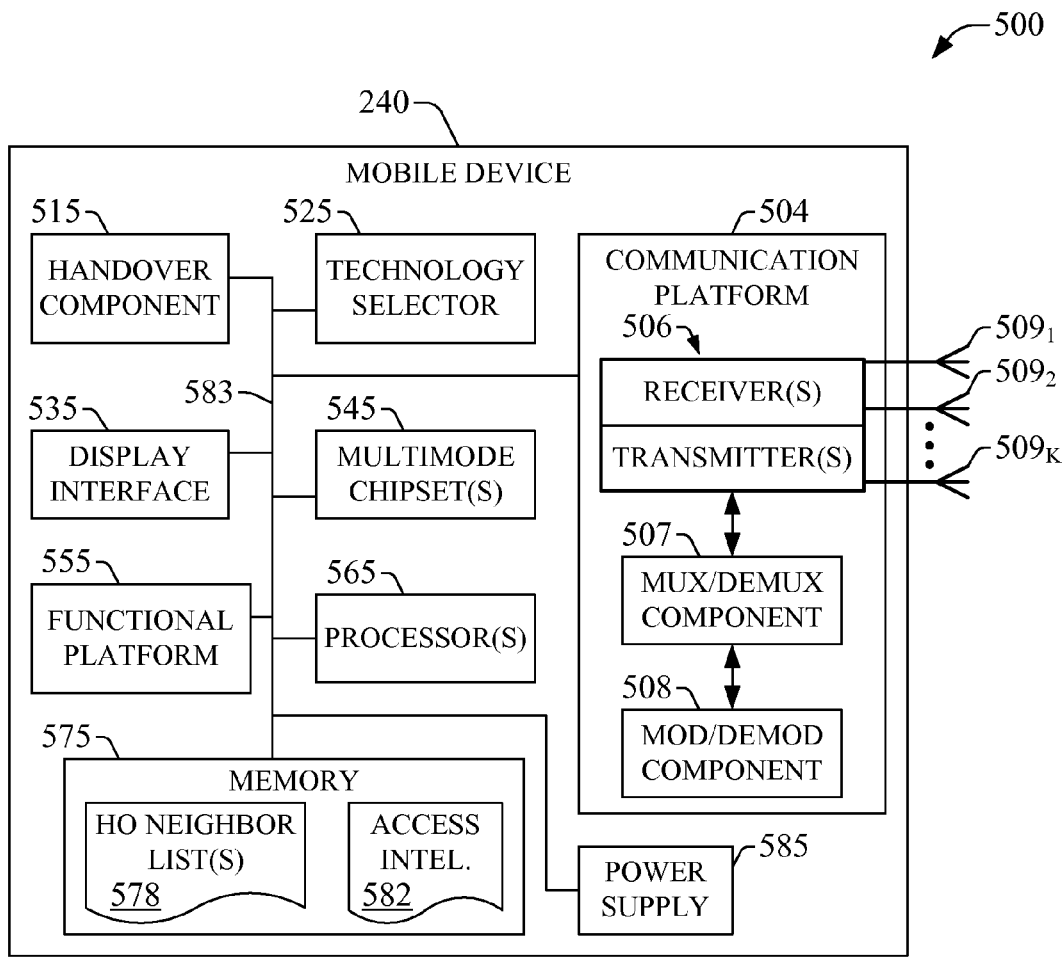
FIG. 5 is a block diagram of an example embodiment of a mobile device that can handover from macro coverage to femto coverage in accordance with aspects described herein.

FIG. 5 is a block diagram of an example embodiment 500 of a mobile device 240 that can handover from macro coverage to femto coverage in accordance with aspects described herein. In mobile device 240, which can operate in multi-technology multimode, a set of antennas $509_1$-$509_K$ (K is a natural number) can receive and transmit signal(s) from and to network elements such as base stations, access terminals, wireless ports and routers, or the like, that operate in a radio access network. Antennas $509_1$-$509_K$ are a part of communication platform 504, which can comprise electronic components and associated circuitry that enable processing and manipulation of received wireless signal(s) and wireless signal(s) to be transmitted. Wireless signal(s) can include traffic (e.g., a portion of data 233) and signaling such as at least a portion of signaling 235. In an aspect, communication platform 504 can receive and deliver signaling that allows MTF handover in accordance with aspects described herein.

In an aspect, communication platform 504 includes receiver(s)/transmitter(s) 506 that can convert signal from analog to digital upon reception, and from digital to analog upon transmission. Receiver/transmitter 506 also can divide a single data stream into multiple, parallel data streams, or perform the reciprocal operation; such operations typically conducted in various multiplexing schemes. Functionally coupled to receiver(s)/transmitter(s) 506 is a multiplexer/demultiplexer (mux/demux) component 507 that facilitates manipulation of signal in time and frequency space. Electronic mux/demux component 507 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 507 can scramble and spread information (e.g., codes) according to substantially any code; e.g., Hadamard-Walsh codes, Baker codes, Kasami codes, polyphase codes, and so on. A modulator/demodulator (mod/demod) component 508 also is a part of communication platform 504, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 500, mod/demod component 508 is functionally coupled to mux/demux component 507. Additionally, in embodiment 500, processor(s) 565 enables, at least in part, mobile device 240 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Handover component 515 can scan and decode wireless signal(s) associated with one or more femtocells deployed within a macrocell. A scan conducted in preparation for HO by mobile device 510 can survey and compare signals transported in a set of electromagnetic (EM) frequency bands, which can comprise radio frequency (RF) portion(s) and microwave portion(s) of the EM spectrum, although other spectral regions can be included; and a set of radio technologies. Alternatively, or in addition, scanning of macro wireless environment can include scanning for specific femtocell system broadcast messages linked to specific technologies and conveyed through disparate frequency carriers. A network operator that manages at least one of a macro network platform or a femto network platform can determine the set of EM frequency bands and radio technologies to be surveyed. Frequency bands, or frequency carriers therein, can be added to the set of EM frequency bands as such bands or carriers become available for communication, e.g., auctioned for utilization or authorized for free-of-charge utilization. Similarly, as new radio technologies become standardized, or available, such technologies can be introduced in the set of radio of technologies that is surveyed.

In embodiment 500, multimode chipset(s) 545 can allow mobile device 240 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. In an aspect, multimode chipset(s) 545 can utilize communication platform 504 in accordance with the standard protocols specific to a mode of operation, e.g., GNSS-based communication. In another aspect, multimode chipset(s) 545 can be scheduled to operate concurrently (e.g., when K>1) in various modes or within a multitask paradigm in which the chipset(s) operate in a dedicated mode for a specific time interval.

Technology selector 525 can drive operation of multimode chipset(s) 545 through configuration of one or more radio network technologies for communication in a specific telecommunication mode. In an aspect, when mobile device 214 is enabled with GNSS service, technology selector 625 exploit multimode chipset(s) 645 and communication platform 518 to receive and process GNSS timing messages to extract a location estimate for the mobile device 240. Processing of GNSS timing messages includes implementation of triangulation procedure to generate the location estimate. Switching to operation as a GNSS receiver can be initiated through received signaling as part of a request received to provide a location estimate of the mobile device 240. Such request can be part of signaling 235 received by serving base station 230 and relayed there from to the mobile device.

Mobile device 240 also includes a functional platform 555 that comprises a set of components (not shown) that provide, at least in part, one or more specific functionalities that complement or supplement wireless communication. As an example, in a case mobile device 610 is a telephone, functional platform 555 includes functional elements such as a data entry interface (e.g., a touch screen, a keyboard, a biometric pad for biometric-based access, a microphone, a loud speaker), a camera, peripheral connectors (e.g., a universal serial bus (USB) port or an IEEE 1394 port for transferring data to a disparate device), a voice coder-decoder (vocoder); intelligent component(s) that can respond to voice activated command(s); and so on. It should be appreciated that functional platform 555 can exploit applications (not shown) stored within memory 575 to provide one or more functionalities of the mobile device. For instance, an application can interface a subscribed with GNSS-based location estimates and associated data such as maps, landmarks, related businesses, etc.

Display interface 535, which in one or more disparate or additional embodiments of mobile device 240 can reside within functional platform 655, allows gestures for subscriber-device interaction via at least one of a touch-responsive screen or otherwise such as a liquid crystal display (LCD), a plasma panel, a monolithic thin-film based electrochromic display; a sound interface; or the like. Additionally, display interface 635 can render content(s) that (i) control functionality of mobile device 240 as available in functional platform 555, or (ii) reveal operational conditions of the mobile device 240.

Mobile device 240 also retains access intelligence 582, e.g., access list(s), handover log(s), or the like, in memory 575. At least a portion of such access intelligence 582 can be collected by the mobile device 240, or can be received as part of a provisioning proceeding(s).

In addition, mobile device 240 includes processor(s) 565 configured to confer, and that confer, at least in part, functionality to substantially any or any component, platform, interface, selector, and so forth within mobile device 240 in accordance with one or more aspects of the subject innovation. In embodiment 500, processor(s) 565 is illustrated as external to the various functional elements of mobile device 240; however, processor(s) 565 can be distributed amongst such various functional elements. Processor(s) 565 is functionally coupled to each functional element (e.g., component, interface, platform, selector) and to memory 575 through bus 583, which can be embodied in at least one of a memory bus, a system bus, an address bus, or one or more reference link(s) or interface(s). Processor(s) 565 can store information in and retrieve information from memory 575 necessary to operate and/or confer functionality, at least in part, to communication platform 504, handover component 515, technology selector 525, multimode chipset(s) 545, display interface 535, functional platform 555 and component therein, and other operational components (not shown) of multimode mobile device 240. The information can include at least one of code instructions, data structures, or the like.

Memory 575 can store data structures (e.g., metadata); code structure(s) (e.g., modules, objects, classes, procedures) or instructions, or substantially any type of software or firmware that processor(s) 565 can execute to provide functionality associated with substantially any or any component, platform, interface, selector, and so forth, within mobile device 240, in accordance with aspects of the subject innovation. In addition, memory 575 can retain network or device information (not shown) such as pilot signal(s) (e.g., sounding reference signal(s)); one or more communication protocol(s) or technical specification(s); code sequences for scrambling or spreading; blind decoding hypothesis; semi-persistent scheduling parameters; frequency offsets, macro cell IDs; address book(s); or the like. Moreover, memory 575 can retain content(s) such as multimedia files or subscriber-generated data; security credentials (e.g., passwords, encryption keys, digital certificates, biometric keys such as voice recordings, iris patterns, fingerprints); hardware identifying tokens or codes such as at least one of an international mobile subscriber identity (IMSI), a temporary mobile subscriber identity (TMSI), packet TMSI (P-TMSI), an international mobile equipment identifier (IMEI), a mobile directory number (MDN), a mobile identification number (MIN), a Telecommunications Industry Association (TIA) electronic serial number (ESN), or a multi-bit identification number like the mobile identity number (MEID). It is noted that memory 575 can include stationary or removable elements such as a subscriber identification module (SIM) card storage, a universal integrated circuit card (UICC) storage, or a removable user identity module (RUIM).

Mobile device 240 also includes power supply 585, which can deliver power to components or functional elements within mobile device 240. Power supply 585 can be a rechargeable power supply, e.g., a rechargeable battery, and it can include one or more transformers to achieve power level(s) that can operate mobile device 240 and components, functional elements, and related circuitry therein. In an aspect, power supply 585 can attach to a conventional power grid to recharge and ensure mobile device 240 is operational; power supply 585 can include an I/O interface to operationally connect to the conventional power grid. Moreover, power supply 585 can include an energy conversion component, such as a solar-based panel to provide additional or alternative power resources or autonomy to mobile device 240.

Figure 6:
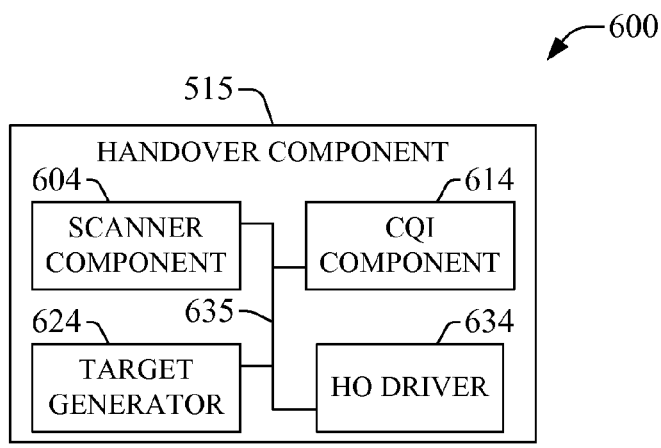
FIG. 6 is a block diagram of an example embodiment of a handover component that operates in a mobile device in accordance with aspects described in the subject specification.

FIG. 6 is a block diagram of an example embodiment 600 of a handover component 515 in accordance with aspects described in the subject specification. Wireless pilot signal(s) can originate from at least one of femto access point(s) 270 and can be conveyed through over-the-air link(s) 135. For femto AP(s) 270, scanner component(s) 604 can detect signals that include DL reference signal(s) and signal strength report(s) generated by the femto AP(s) 270 in response to UL sounding signal(s) conveyed by mobile device 240. Scan of signaling originated by deployed femto APs can survey received wireless signals over a set of EM frequency bands that can include all licensed EM frequency bands (e.g., personal communication services (PCS), advanced wireless services (AWS), general wireless communications service (GWCS), and so forth), and all unlicensed frequency bands currently available for telecommunication (e.g., the 2.4 GHz industrial, medical and scientific (IMS) band or one or more of the 5 GHz set of bands). Additionally, the set of radio technologies surveyed during the scan of indoor wireless environment includes one or more telecommunication technologies such as Wi-Fi, WiMAX, 3GPP2 UMB, Enhanced GPRS, 3GPP UMTS, 3GPP LTE, HSPA, HSDPA, HSUPA, or LTE Advanced.

To conduct a scan, scanner component 604 exploits at least in part communication platform 504. In an aspect, scanner component 604 can configure a transceiver component (e.g., 506) to collect signal in a specific frequency carrier, e.g., frequency channel. Such configuration can allow determination of downlink (DL) carrier frequency, or channel number. Additionally, scanner component 604 can configure demodulation and demultiplexing operation of mux/demux component 507 in accordance with standard protocols associated with the set of disparate telecommunication technologies that are surveyed; in an aspect, the various protocols and instructions necessary for implementation thereof can reside in memory 575. Thus, demodulation and demultiplexing configuration enable determination of radio technology employed in DL signal or UL signal.

It is noted that communication platform 504 can exploit, through processor(s) 565, circuitry such as one or more multimode chipset(s) 545, and at least a portion of processor(s) 565 to switch radio technologies within a configurable and upgradable set of technologies in order to effect telecommunication and enable a scan in accordance with configured demodulation and demultiplexing associated with a radio technology. Such technology agility can afford blind determination, e.g., identification by inspection, of radio technology employed by various femto APs deployed within a macro cell or sector, and thus detection of distinct virtual femto nodes pertaining to a specific radio technology.

Scanner component 604 can decode received wireless signals and thus determine a femto AP identifier code such as SAC(s) 720. In an aspect, the identifier code can be a numeric index that characterizes a pilot code sequence, e.g., a Zadoff-Chu sequence, or an M-sequence. Decoding can be based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. To determine code sequences and thus one or more of the foregoing identities or identifiers, scanner component 604 can compute cross-correlation of decoded signal(s) and a set of code sequence hypotheses. Code sequences can include at least one of a scrambling code, a pseudonoise (PN) sequence, a chirp-like sequence, and so forth. Code sequence hypotheses (not shown) can be retained in memory 575. When a code sequence has been determined, an index that identifies, for example, a decoded scrambling code can be established as a femto AP identifier; the index can be a composite index based at least in part on the type of decoded sequence. Scanner component(s) 212 can identify a plurality of femto APs, which can operate in disparate radio technologies.

To generate at least in part a list of target femto APs, or HO neighbor list(s) 578, scanner component 604 also can convey, through communication platform 504, UL sounding signal(s) to a group of one or more identified femto APs and receive UL signal quality report(s) associated with the conveyed UL sounding signal(s). Such reports can (i) be embodied in a SMS communication, a MMS communication, a USSD message, or in one or more bits in at least one of control channel(s), data packet header(s), management frame(s), or management packet(s), and (ii) received through signaling via wireless link(s) 135.

Channel quality indicator (CQI) component 614 can evaluate at least one of quality or strength of scanned wireless pilot signal(s) originating from a set of neighboring femto APs (e.g., 270). Signal strength can be determined through received signal strength indicators (RSSIs) or received signal code power (RSCP), while quality can be assessed through metrics such as signal-to-noise ratio (SNR), signal-to-noise-and-interference ratio (SNIR), or energy per chip over total received power ($E_c/N_0$). In an aspect, CQI component 614 can analyze noise measurements effected by scanner component 604 to extract noise features such as spectral profile, noise amplitude, statistics, etc., and therefore generate at least in part the foregoing channel quality metrics.

To produce, at least in part, a list of target femto APs for macro-to-femto handover, target generator component 624, also herein referred to as target generator 624, can rank a set of one or more of the surveyed femto APs in accordance at least in part with one or more of the channel quality metrics generated by CQI component 614. Target generator component 624 can exploit such ranking to produce HO neighbor list(s) 578 and retain such list(s) in memory 575. In addition, target generator component 624 can cast at least a portion of HO neighbor list(s) 578 as virtual femto node(s), which, as discussed above, mobile device 240 can report to macro network platform 210 as part of handover proceedings.

Handover (HO) driver component 634, referred herein also as HO driver 634, can manage handover signaling that allows at least one of scanning of wireless environment and femto APs deployed therein, attachment to a specific femto AP and detachment from a serving base station, e.g., 230, or selection of one or more femto APs within HO neighbor list(s) 578 or virtual femto node(s) therein.

In embodiment 600 of handover component 515, two or more components therein can be functionally coupled through a bus 635 to exchange at least one of data and signaling; bus 635 can be embodied in at least one of a memory bus, a system bus, an address bus, or one or more reference link(s) or interface(s).

Figure 7:
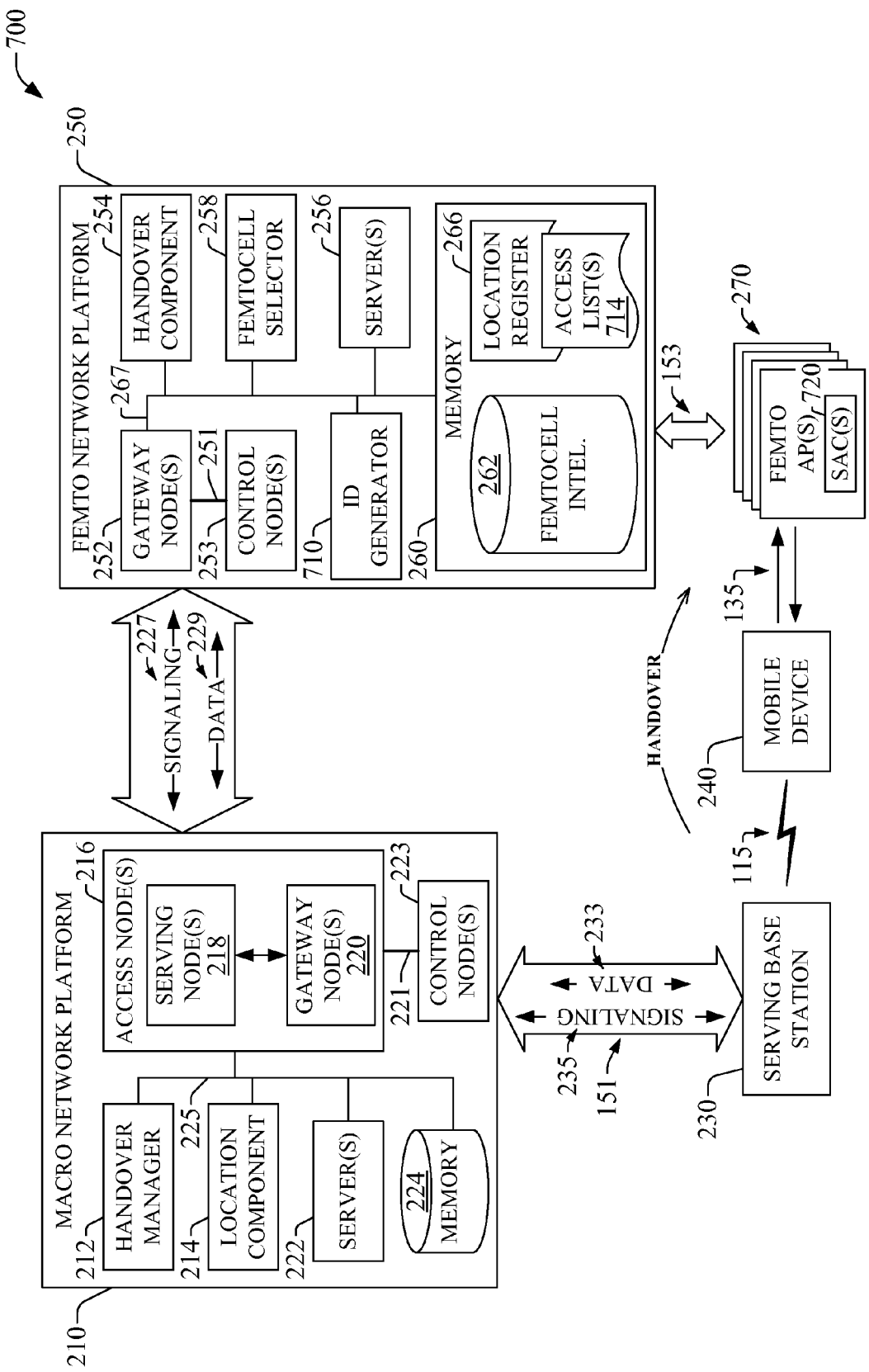
FIG. 7 is a block diagram of an example system that enables macro-to-femto handover in accordance with aspects described herein.

FIG. 7 is a block diagram of an example system that enables macro-to-femto handover in accordance with aspects described herein. In addition to location-based MTF HO driver, identifying information for femto APs can be employed as described herein to control access to a femtocell upon MTF handover. Utilization of such identification information relies at least in part on capability(ies) of a mobile device, e.g., 240, to extract a unique identifier for femtocell. In an aspect, identification (ID) generator component 710, also herein referred to as identification generator 710, can assign each provisioned femtocell a unique service area code (SAC) 720, and configure access privileges, e.g., "authorized full access," "authorized restricted access," "access denied," or the like, for a mobile device to access each femtocell based at least in part on the unique SAC associated therewith. Access privileges for a mobile device can be recorded in access list(s) 714, which links access privileges for a mobile device 240 with a unique identifier thereof—generally, customer(s) authorized in a particular femtocell or associated access point(s) can be granted radio resources. Such unique identifier can include at least one of an IMSI, a TMSI, a P-TMSI, an IMEI, an MDN, a MIN, TIA ESN, or a multi-bit MEID. It is noted that, in an aspect, access privileges allow emergency calls to be served by each provisioned femto AP regardless identifier(s) of a mobile device that places the call. It is also noted that femto network platform 250 can deliver, via gateway node(s) 252 and through link(s) 226, one or more access list(s) 714 to macro network platform 210, which can relay the one or more access list(s) 714 to a mobile device, e.g., device 240; the one or more access list(s) 714 can be retained as part of access intelligence 582 within mobile device 240.

Configured unique SAC can allow, at least in part, MTF handover of mobile device 240. As described supra, mobile device 240 can scan neighbor femto APs as part of MTF handover preparation in order to generate a HO neighbor list; scanning can be effected by scanner component 604, which can be part of handover component 515. In an aspect, as part of generation of the HO target list, mobile device 240 scans and decodes pilot signal(s) from a set of neighbor femto APs to extract, or decode, SAC(s) 720 for each femto AP in the set, e.g., femto AP(s) 270. Based at least in part on SAC information and related access privileges, mobile device 240 can selectively scan pilot signal(s) to determine channel quality or signal(s) condition for femto APs in the set of neighbor femto APs to which the mobile device 240 is authorized to access. It should be appreciated that assessment of channel quality typically exerts higher battery drain that decoding a SAC or most any unique identifier for the femto AP. Accordingly, SAC information and related selective scanning allow mobile device 240 to skip, or avoid, measuring at least one of pilot signal(s) or system message(s) for neighbor femto APs, or femtocells, that mobile device 240 is not allowed to access as established through access list(s) 714. Thus ensuing an enhanced battery lifetime with respect to scanning-intensive generation of a HO neighbor list. Scanning of authorized femto APs by mobile device 240 enable generation of the HO neighbor list, as described above in connection with handover component 515.

Additionally, macro network platform 210, via handover manager 212, can exploit shared network area (SNA) access information to extract the identity of mobile device 240. In an aspect, the identity of mobile device 240 can be retrieved by the macro network platform 210 based on at least one of IMSI, TMSI, P-TMSI information sent in signaling messages, e.g., as part of attachment to a serving macro base station, e.g., 230. It is noted that macro network platform 210 can exploit other unique identifiers for the mobile device such as IMSI, MDN, MIN, ESN, MEID, or the like.

To implement MTF handover of mobile device 240, handover manager 212 can check the extracted identity of mobile device 240 with a selected target femto AP identifying information based at least in part on at least one of assigned SAC(s) 720, femtocell ID, femtocell intelligence 262, or configured features of access list(s) 714. It should be appreciated that at such validation stage of MTF handover, mobile device 240 is likely to be authorized to access the selected target femto AP otherwise it will not measure pilot signal(s) from and assess channel quality of the selected target femtocell. Upon authorization, mobile device 240 conveys a MTF handover request to the selected femto AP to macro network platform 210. MTF handover request can be received by control node(s) 223 as part of signaling 235. Control node(s) 223 relay, through reference link 221, the MTF handover request to access node(s) 216 which communicate the MTF HO request to handover manager 212. Since the mobile 240 is authorized to access the selected target femto AP, handover manager 212 conveys the request to gateway node(s) 252, through signaling 227, and the request is relayed to handover component 254. Handover component 254 can confirm access privileges of mobile device 240 to the selected femto AP and accept, or grant, the MTF HO request. As a result, handover component 254 can prepare at least one of a femto gateway node, a femto control node, or the selected femto AP for MTF HO of the mobile device. Preparation can include aspects described supra.

When mobile device 240 is not authorized to access the selected target femto AP, a mobile-initiated relocation request is rejected prior to mobile device 240 camping, or effecting a successful attachment procedure, on the selected target femto AP and requesting radio resources. Thus, such validation stage can serve as a redundancy layer, or additional check, to ensure adequate MTF HO authorization of the relocation request. Upon rejection of a delivered MTF handover request, mobile device 240 can update a target femto AP based at least in part on the generated HO neighbor list and attempt MTF handover. Mobile device 240 can effect a finite number of MTF handover attempts, the number upper bounded by the number of candidate target femto APs in the generated HO neighbor list.

At least one advantage of selective scanning of pilot signal(s) as dictated at least in part by SAC(s) 720 is mitigation of signaling between a mobile device and candidate, or target, femto APs with ensuing increase in battery life of the mobile device, and reduction of processor(s) load therein. Additionally, it is noted that signaling is reduced at least in part as a result of attempts from the mobile device at MTF handover towards authorized target femtocell(s) without attempted HOs to unauthorized femtocells, which can lead to rejection of such attempted HOs.

Handover component 254 can exploit artificial intelligence (AI) or machine learning methods in addition to historical data on MTF handover to infer (e.g., reason and draw a conclusion based upon a set of metrics, arguments, or known outcomes in controlled scenarios) a satisfactory or optimal femto AP to serve a mobile device that undergoes macro-to-femto HO; a suitable range between a candidate target femto AP and a mobile device that implements MTF HO; or a pilot signal(s) transmission power and time interval to increase likelihood of a mobile device attachment to a selected femto AP. Historical MTF HO data can be retained as part of a MTF HO log generated at least in part upon successful macro-to-femto handover by a mobile device, e.g., mobile device 240, and stored in memory 260 or memory 224.

Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, handover component 254 or any component(s) therein can employ one of numerous methodologies for learning from data and then drawing inferences from the models so constructed. Such methodologies can be retained in memory 260. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited.

In view of the example systems described above, example methods that can be implemented in accordance with the disclosed subject matter can be better appreciated with reference to flowcharts in FIGS. 8-14. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to facilitate transporting and transferring such methodologies to computers for execution, and thus implementation, by a processor or for storage in a memory.

Figure 8:
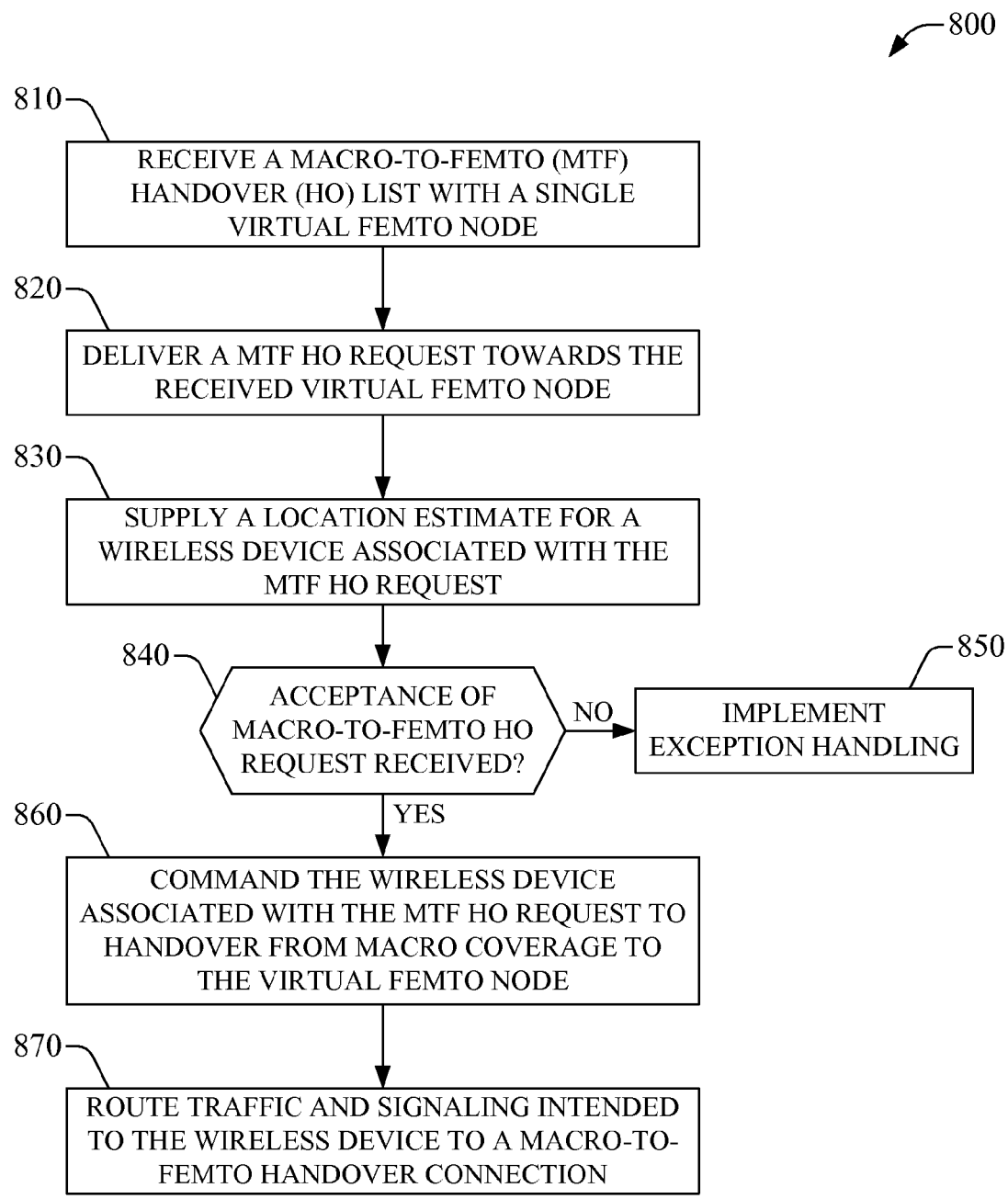
FIG. 8 displays a flowchart of an example method for enabling macrocell to femtocell handover according to aspects described herein.

FIG. 8 displays a flowchart of an example method 800 for enabling access control to a femto access point as part of macrocell to femtocell handover according to aspects described herein. One or more network components (e.g., handover manager 212, server(s) 222, handover component 236, server(s) 240) can implement the subject example method 800. Additionally or alternatively, at least one processor that confers, at least in part, functionality to the one or more network components can enact the subject example method 800. At act 810, a macro-to-femto (MTF) handover (HO) list with a single virtual femto node is received. Reception of the MTF HO list can be part of a MTF HO request, and can be received from a mobile device served by a macrocell base station. At act 820, a MTF HO request towards the received virtual femto node is delivered. At act 830, a location estimate is supplied for a wireless device associated with the MTF HO request. In an aspect, location estimate can be supplied through a location component (e.g., component 214) which can be part of the one or more network components that can enact the subject example method 800. Location estimates can be based at least in part on at least one of GNSS location estimates or TOF location estimates; related position determination functions and associated nodes that implement one or more of the PDFs can generate the location estimates. TOF estimates can include RTT, TOA, TDOA, AOA determined through DL or UL pilot signal(s).

At act 840, it is determined if acceptance of MTF HO request is received. In an aspect, Acceptance can be indicated through signaling 227 via an ACK (acknowledge); ACK signaling can be embodied, for example, in one or more reserved bits in a packet header, a light-payload (e.g., of the order of 1 byte) data packet, a predetermined multi-bit word conveyed in a radio frame within a control channel, etc. In the negative case, exception handling is implemented at act 850. Implementation of exception handling can include implementation of a retry cycle in which a predetermined number M, an integer, of MTF HO requests are attempted at predetermined intervals until the request is accepted or M attempts are completed. In the affirmative case, at act 860, the mobile device associated with the MTF HO request is commanded to handover from macro coverage to the virtual femto node. At act 870, traffic and signaling intended to the requester wireless device is routed to a macro-to-femto handover connection.

Figure 9:
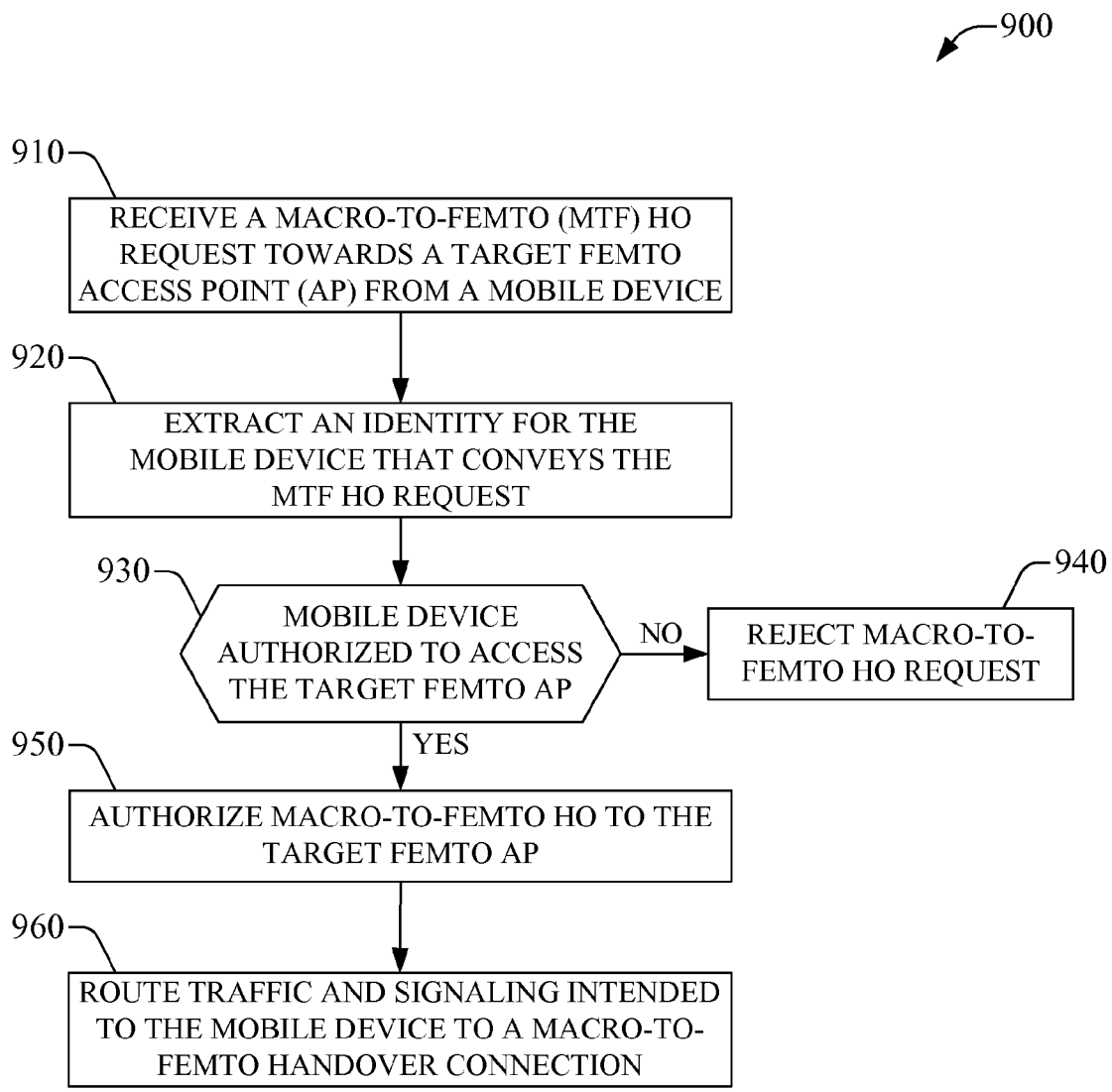
FIG. 9 is a flowchart of an example method enabling macrocell to femtocell handover according to aspects described herein.

FIG. 9 is a flowchart of an example method 900 enabling macrocell to femtocell handover according to aspects described herein. One or more network components (e.g., handover manager 212, server(s) 222, handover component 236, server(s) 240) can implement the subject example method 900. Additionally or alternatively, at least one processor that confers, at least in part, functionality to the one or more network components can enact the subject example method 900. At act 910, a MTF HO request towards a target femto access point (AP) is received from a mobile device. At act 920, an identity for the mobile device that conveys the MTF HO request is extracted. The identity can include at least one of at least one of an IMSI, a TMSI, a P-TMSI, an IMEI, an MDN, a MIN, an ESN, or a multi-bit identification number such as a MEID. At act 930, it is evaluated if the mobile device is authorized to access the target femto AP. In the negative case, the MTF HO request is rejected act 940. In the affirmative case, at act 950, macro-to-femto HO to the target femto AP is authorized. An authorization indication can be conveyed through signaling 235 via an ACK (acknowledge); ACK signaling can be embodied, for example, in one or more reserved bits in a packet header, a light-payload (e.g., of the order of 1 byte) data packet, a predetermined multi-bit word conveyed in a radio frame within a control channel, etc. At act 960, traffic and signaling intended to the mobile device is routed to a macro-to-femto HO connection.

Figure 10:
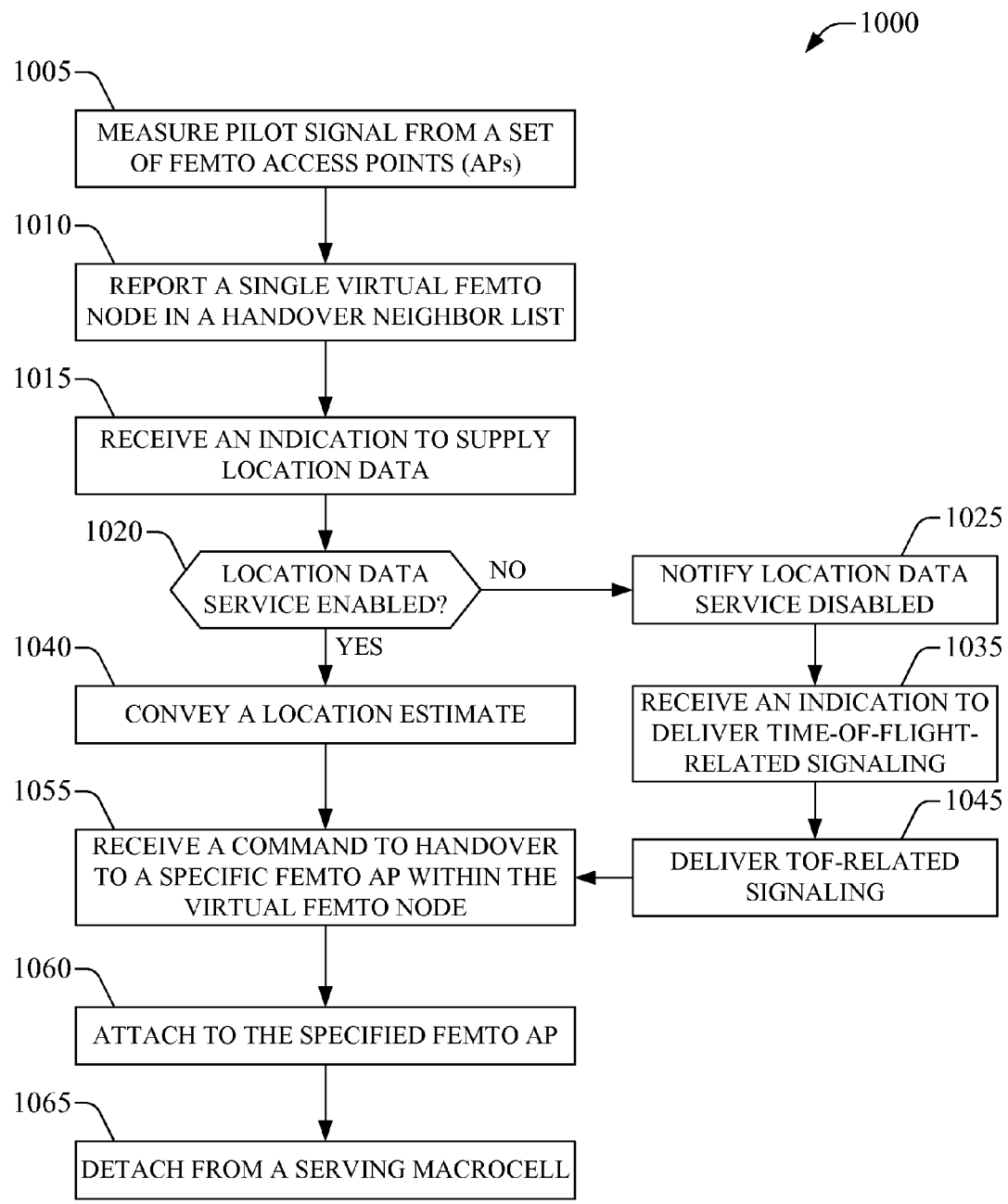
FIG. 10 displays a flowchart of an example method for handing off from macro coverage to femto coverage according to aspects described herein.

FIG. 10 displays a flowchart of an example method 1000 for handing off from macro coverage to femto coverage according to aspects described herein. A mobile device or one or more components therein can enact the subject example method 1000. Additionally or alternatively, at least one processor that confers, at least in part, functionality to the mobile device or the one or more components therein can enact the subject example method 1000. At act 1005, pilot signal(s) from a set of femto access points is measured. In an aspect, pilot signal(s) are measured on at least one of a set of radio technologies and a set of frequency bands, either licensed or unlicensed. Measurements to be conducted can be specified, at least in part, in a scan configuration retained within a memory, removable or otherwise, of the mobile device that enacts the subject example method 1000. At act 1010, a single virtual femto node in a handover neighbor list is reported. At act 1015, an indication is received to supply location data. Such an indication can be conveyed as part of signaling 235 to a macro base station that serves the mobile device that enacts the subject example method; the macro base station can relay the indication to the mobile device through an over-the-air link (e.g., wireless link 115).

At act 1020, it is determined if location data service is enabled. The determination can be effected by the mobile device that enacts the subject example method 1000 in response to the indication to supply location data at act 1015. In the negative case, location data service disabled is notified at act 1025. At act 1035 an indication to deliver time-of-flight (TOF)-related signaling is received. The indication can be part of measurement(s) of propagation timing of wireless signal(s) included in TOF measurements. At act 1045, TOF-related signaling is delivered and flow is directed to act 1055. Conversely, when outcome of act 1020 is positive, a location estimate is conveyed at act 1040. In an aspect, conveying the location estimate can include receiving GNSS-based timing messages and time-stamping reception of the GNSS-based timing messages to implement, at least in part, triangulation of the mobile device that enacts the subject example method to generate the location estimate. At act 1055, a command to handover to a specific femto AP within the virtual femto node is received.

At act 1060, attachment to the specified femto AP occurs. To effect attachment to the femto AP, the mobile device the enacts that subject example method 1000 exchanges control signaling that enables, for example, LAU and RAU in order to access radio resources provided through the specified femto AP. At act 1065, detachment from a serving macro cell is effected. In an aspect, as part of detachment, the mobile device that enacts the subject example method 1000 can request at least one of revocation of granted, or scheduled, radio resources; termination or transfer of active radio bearers; or data transfer to a macro-to-femto connection and associated serving node(s) and gateway node(s) within a femto network platform that administers, at least in part, the specified femto AP.

Figure 11:
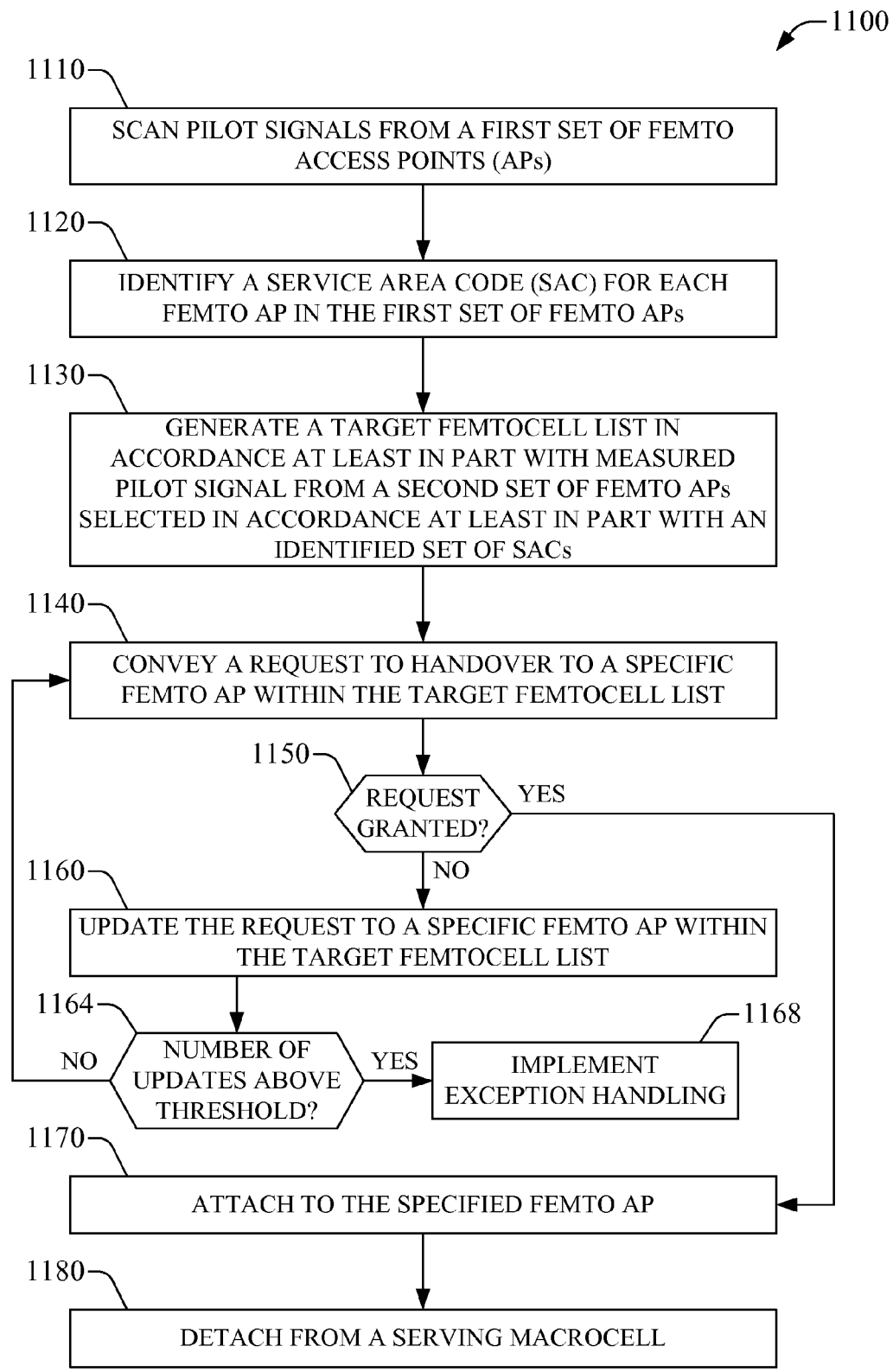
FIG. 11 is a flowchart of an example method for handing off from macro coverage to femto coverage according to aspects described herein.

FIG. 11 is a flowchart of an example method 1100 for handing off from macro coverage to femto coverage according to aspects described herein. A mobile device or one or more components therein can enact the subject example method 1100. Additionally or alternatively, at least one processor that confers, at least in part, functionality to the mobile device or the one or more components therein can enact the subject example method 1100. At act 1110, pilot signals from a first set of femto APs are scanned. In an aspect, pilot signal(s) are measured on at least one of a set of radio technologies and a set of frequency bands, either licensed or unlicensed. Measurements can be specified, at least in part, in a scan configuration retained within a memory (e.g., memory 575), removable or otherwise, of the mobile device that enacts the subject example method 1100. At act 1120, a service area code (SAC) is identified for each femto AP in the set of femto APs. At act 1130, a target femtocell list is generated in accordance at least in part with measured pilot signals from a second set of femto APs selected in accordance at least in part with an identified set of SACs. At act 1140, a request to handover to a specific femto AP within the target femtocell list is conveyed.

At act 1150, it is probed if the request is granted. One or more network components, e.g., handover manager 212, can grant or deny the request. In an aspect, the request can be indicated through signaling 235 via an ACK signal; ACK signaling can be embodied, for example, in one or more reserved bits in a packet header, a light-payload (e.g., of the order of 1 byte) data packet, a predetermined multi-bit word conveyed in a radio frame within a control channel, etc. When the request is denied, the HO request to a specific femto AP within the target femtocell list is updated at act 1160. The update can be directed to requesting handoff to a disparate femto AP in the target femtocell list. At act 1164, it is determined if a number of updates is above threshold, the threshold can be configurable by a network operator or can be established by the cardinality of the set of target femto APs in HO neighbor list. In the affirmative case, exception handling is implemented at act 1168. Implementation of exception handling can include implementation of a retry cycle in which a predetermined number M, an integer, of MTF HO requests are attempted at predetermined intervals until the request is accepted or M attempts are completed. Conversely, in the negative case, flow is directed to act 1140 upon updating the request.

When the request is granted at act 1150, attachment to the specified femto AP occurs at act 1170. To effect attachment to the femto AP, the mobile device the enacts that subject example method 1000 exchanges control signaling that enables, for example, LAU and RAU in order to access radio resources provided through the specified femto AP. At act 1180, detachment from a serving macrocell is effected. In an aspect, as part of detachment, the mobile device that enacts the subject example method 1000 can request at least one of revocation of granted, or scheduled, radio resources; termination or transfer of active radio bearers; or data transfer to a macro-to-femto connection and associated serving node(s) and gateway node(s) within a femto network platform that administers, at least in part, the specified femto AP.

Figure 12:
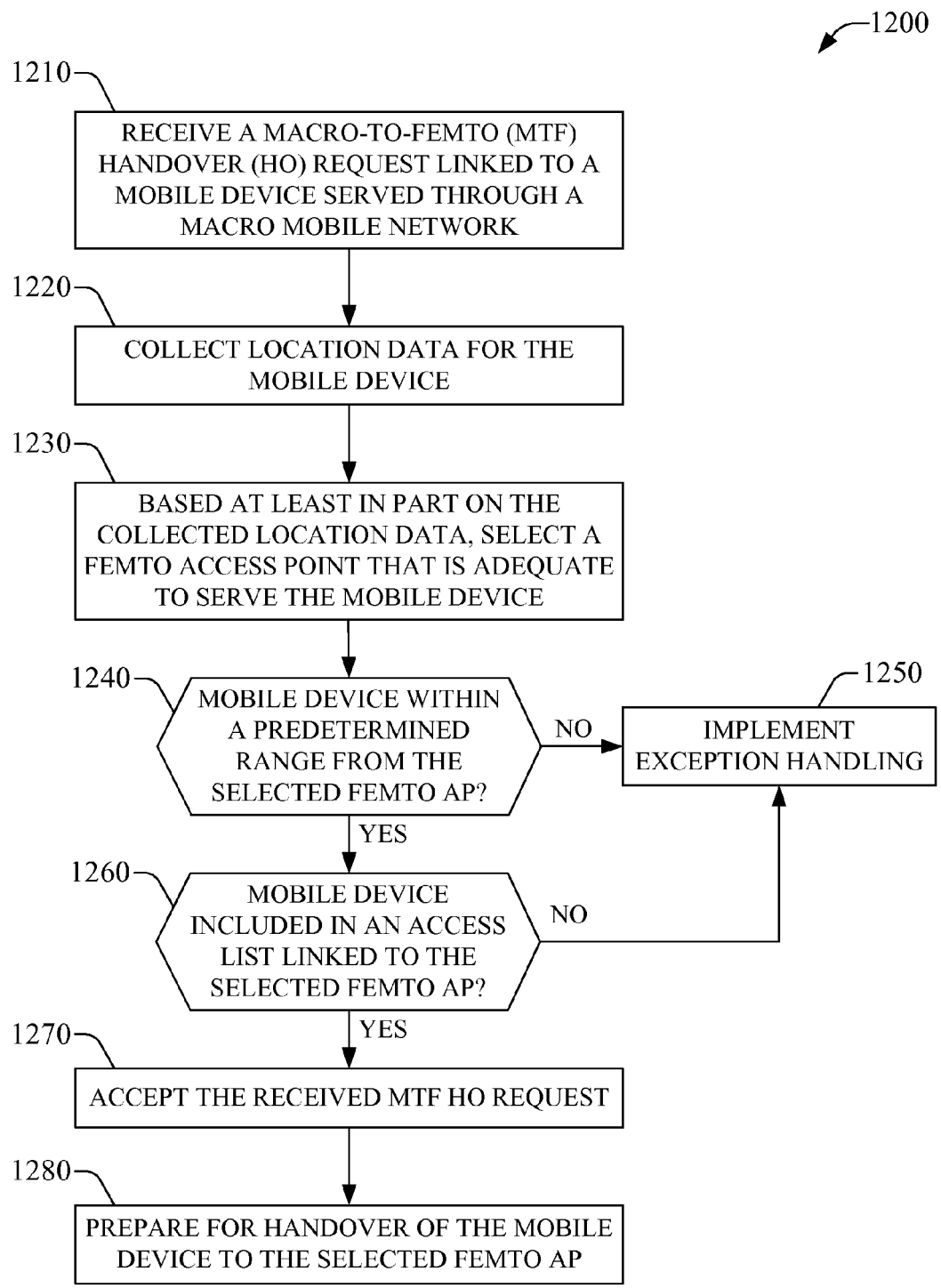
FIG. 12 is a flowchart of an example method for enabling handover from macro coverage to femto coverage according to aspects described herein.

FIG. 12 is a flowchart of an example method 1200 for enabling handover from macro coverage to femto coverage according to aspects described herein. One or more network components (e.g., handover component 236, server(s) 240, handover manager 212, server(s) 222) can implement the subject example method 1200. Additionally or alternatively, at least one processor that confers, at least in part, functionality to the one or more network components can enact the subject example method 1200. At act 1210, a MTF HO request linked to a mobile device served through a macro mobile network is received. At act 1220, location data is collected for the mobile device. At act 1230, based at least in part on the collected location data, a femto AP that is adequate to serve the mobile device is selected. In an aspect, adequacy is gauged based at least in part on a geographical distance from the mobile device. At act 1240, it is evaluated if the mobile device is located within a predetermined range from the selected femto AP. The predetermined range can be configurable by a network operator. In an aspect, the predetermined range can depend at least in part on transmit power for pilot signal(s) of the selected femto AP; the one or more network components that enact the subject method 1200 can autonomously establish a transmit power that minimizes attachment time to the selected femto AP while interference, as measured through noise amplitude, with neighboring femto APs remains below a threshold. When the evaluation outcome is negative, exception handling is implemented at act 1250. Implementation of exception handling can include at least one of rejection of the HO request; implementation of a retry cycle in which a predetermined number M, an integer, of MTF HO requests are attempted at predetermined intervals until the request is accepted or M attempts are completed; or notification procedure(s) to the mobile device or a network component within macro network platform or femto network platform. Conversely, at act 1260, it is determined if the mobile device, or a unique identifier thereof, is included in an access list linked to the selected femto AP. In the affirmative case, when the mobile device is included in the access list linked to the selected femto AP, the received MTF HO request is accepted at act 1270. In an aspect, acceptance can be indicated through signaling 235 via an ACK signal; ACK signaling can be embodied, for example, in one or more reserved bits in a packet header, a light-payload (e.g., of the order of 1 byte) data packet, a predetermined multi-bit word conveyed in a radio frame within a control channel, etc.

At act 1280, preparation for handover of the mobile device to the selected femto AP is effected. In an aspect, preparation can include at least one of reception and retention of data directed towards the mobile device; reallocation or reservation of radio resources such as bandwidth; adjustment of semi-persistent scheduling parameters; configuration of at least one transceiver and associated communication circuitry to operate in a radio technology in which the mobile device operates; or temporary augmentation of pilot signal(s) transmitted power so as to increase femto coverage area outside an intended confined space to increase likelihood of successful attachment by the mobile device.

Figure 13:
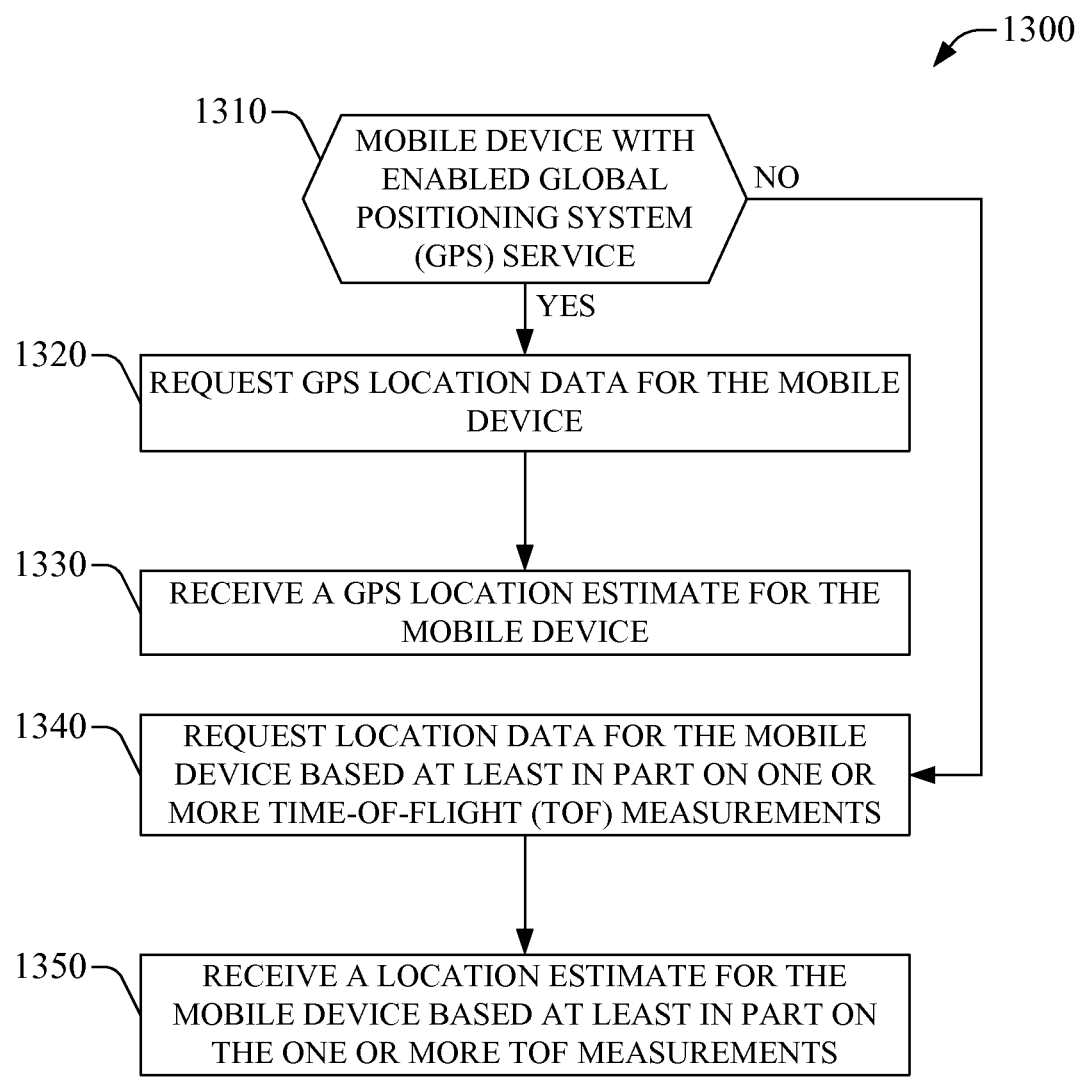
FIG. 13 is a flowchart of an example method for collecting location data for a mobile device that attempts handing off from macro coverage to femto coverage according to aspects disclosed herein.

FIG. 13 is a flowchart of an example method 1300 for collecting location data for a mobile device that attempts handing off from macro coverage to femto coverage according to aspects disclosed herein. One or more network components (e.g., location component 214, server(s) 222, femtocell selector 238, server(s) 222) can implement the subject example method 1300. Additionally or alternatively, at least one processor that confers, at least in part, functionality to the one or more network components can enact the subject example method 1300. At act 1310, it is determined if the mobile device is enabled with GPS service. In the affirmative case, GPS location data is requested for the mobile device at act 1320. In an aspect, a request is generated from one or more components within a femto network platform 250 and conveyed through signaling 229 to a location component (e.g., component 214) or a location server, which can be part of server(s) 222. At act 1330, a GPS location estimate for the mobile device is received. The mobile device can generate the GPS location estimate. Conversely, when outcome to evaluation act 1310 is negative, location data for the mobile device based at least in part on one or more time-of-flight (TOF) measurements is requested at act 1340. At act 1350, a location estimate for the mobile device based at least in part on the one or more TOF measurements is received.

Figure 14:
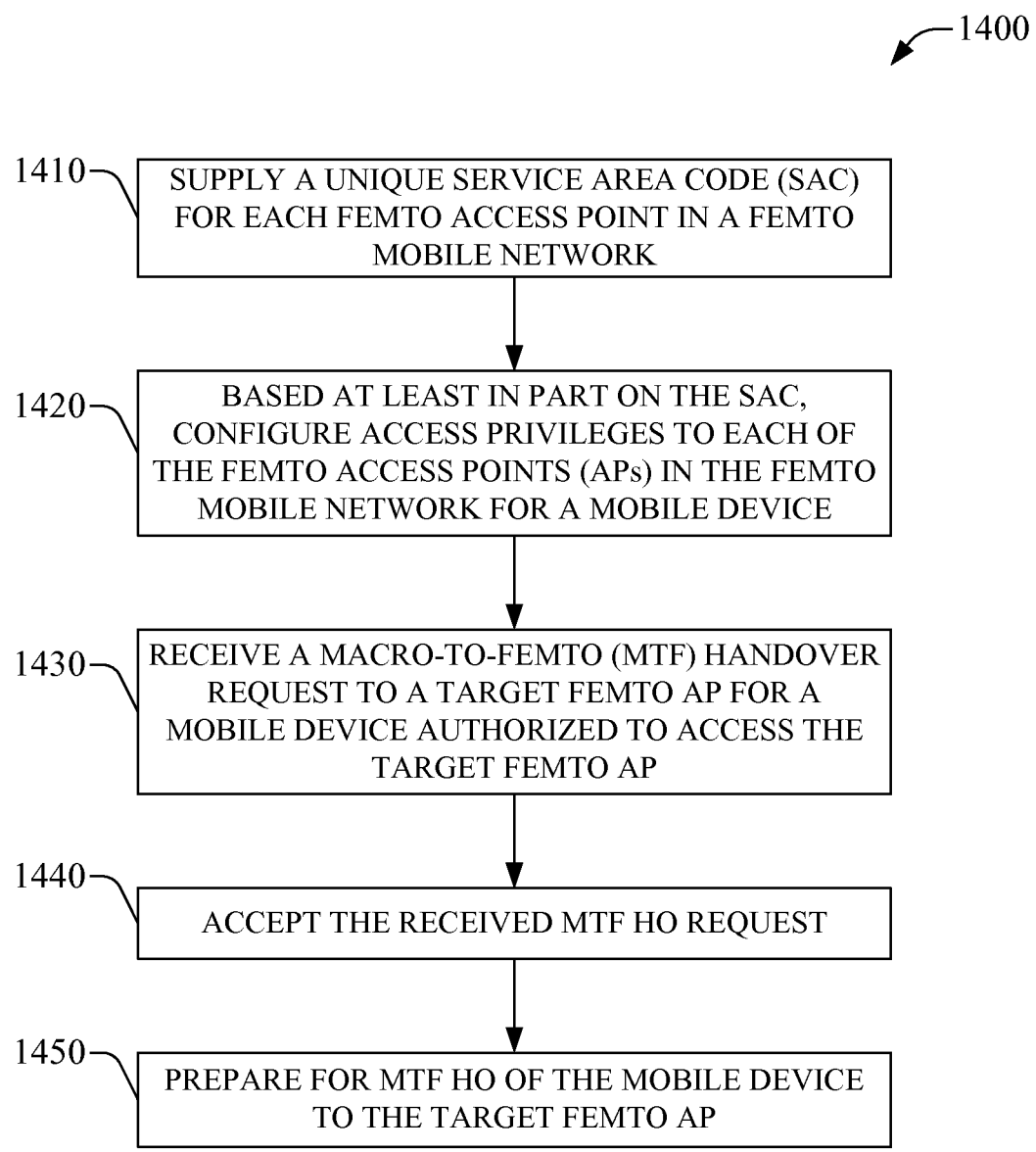
FIG. 14 displays a flowchart of an example method for establishing, at least in part, access to a femto access point, wherein the access can be exploited for macro-to-femto handover as described herein.

FIG. 14 displays a flowchart of an example method 1400 for establishing, at least in part, access and control thereof to a femto AP, wherein the access can be exploited for macroto-femto handover as described herein. It should be appreciated that while the subject method 1400 is illustrated for a femto AP, other indoor-based access points can be exploited. One or more network components (e.g., ID generator 710, a provisioning server within server(s) 256) can implement the subject example method 1400. Additionally or alternatively, at least one processor that confers, at least in part, functionality to the one or more network components can enact the subject example method 1400. At act 1410, a unique service area code (SAC) is supplied for each femto access point in a femto mobile network. At act 1420, based at least in part on the SAC, access privileges to each of the femto APs in the femto mobile network are configured for a mobile device. At act 1430, a MTF HO request to a target femto AP for a mobile device that is authorized to access the target femto AP is received, access is authorized based at least in part on the SAC of the target femto AP and one or more unique identifiers for the mobile device. At act 1440 the received MTF HO request is accepted. In an aspect, acceptance can be indicated through signaling 235 via an ACK signal; ACK signaling can be embodied, for example, in one or more reserved bits in a packet header, a light-payload (e.g., of the order of 1 byte) data packet, a predetermined multi-bit word conveyed in a radio frame within a control channel, etc. At act 1450, preparation for MTF handover of the mobile device to the target femto AP is implemented. Preparation can include one or more of the aspects described above.

Figure 15:
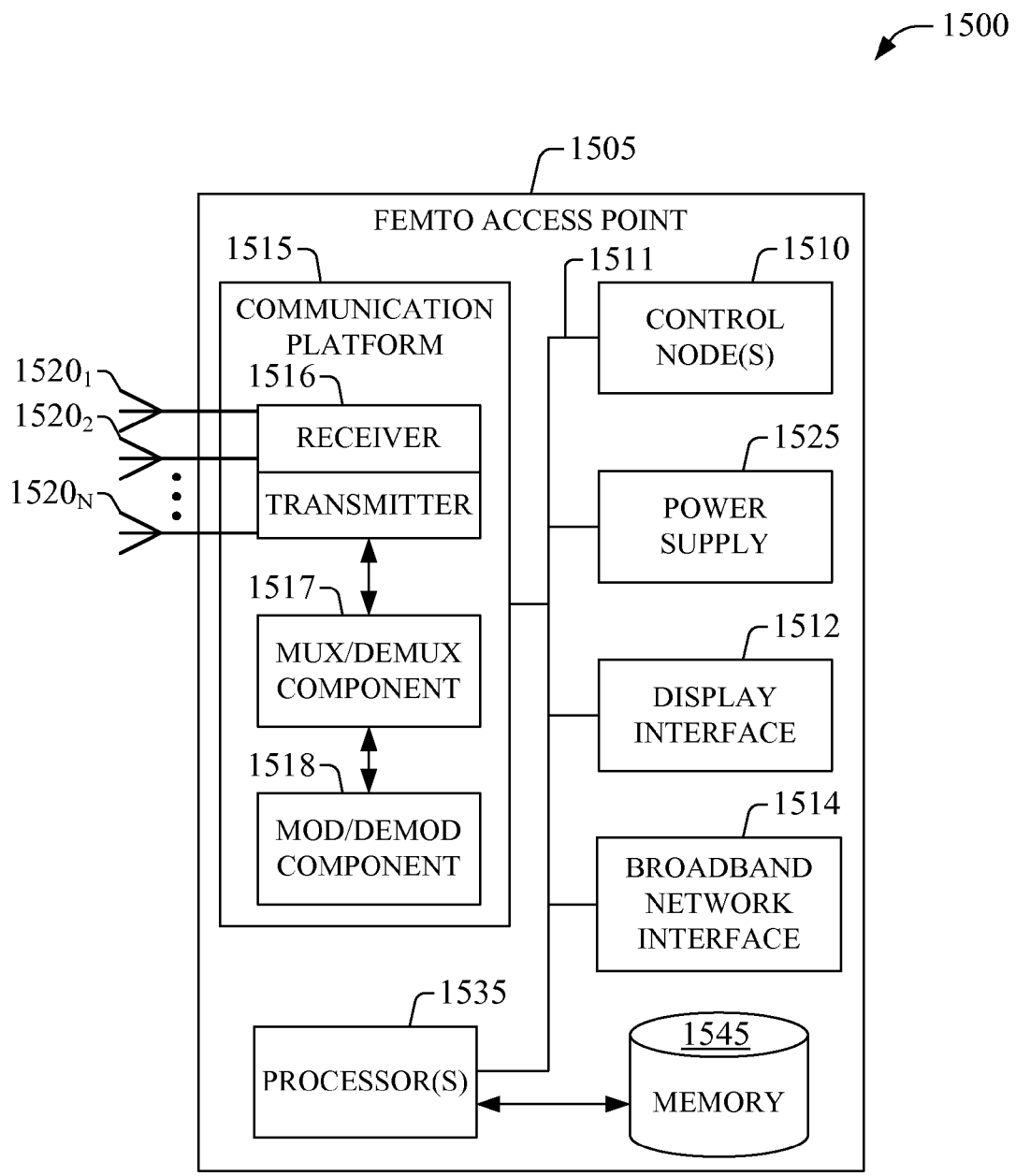
FIG. 15 is a block diagram of an example embodiment of a femtocell access point that can enable or exploit features or aspects described in the subject specification.
Figure 16:
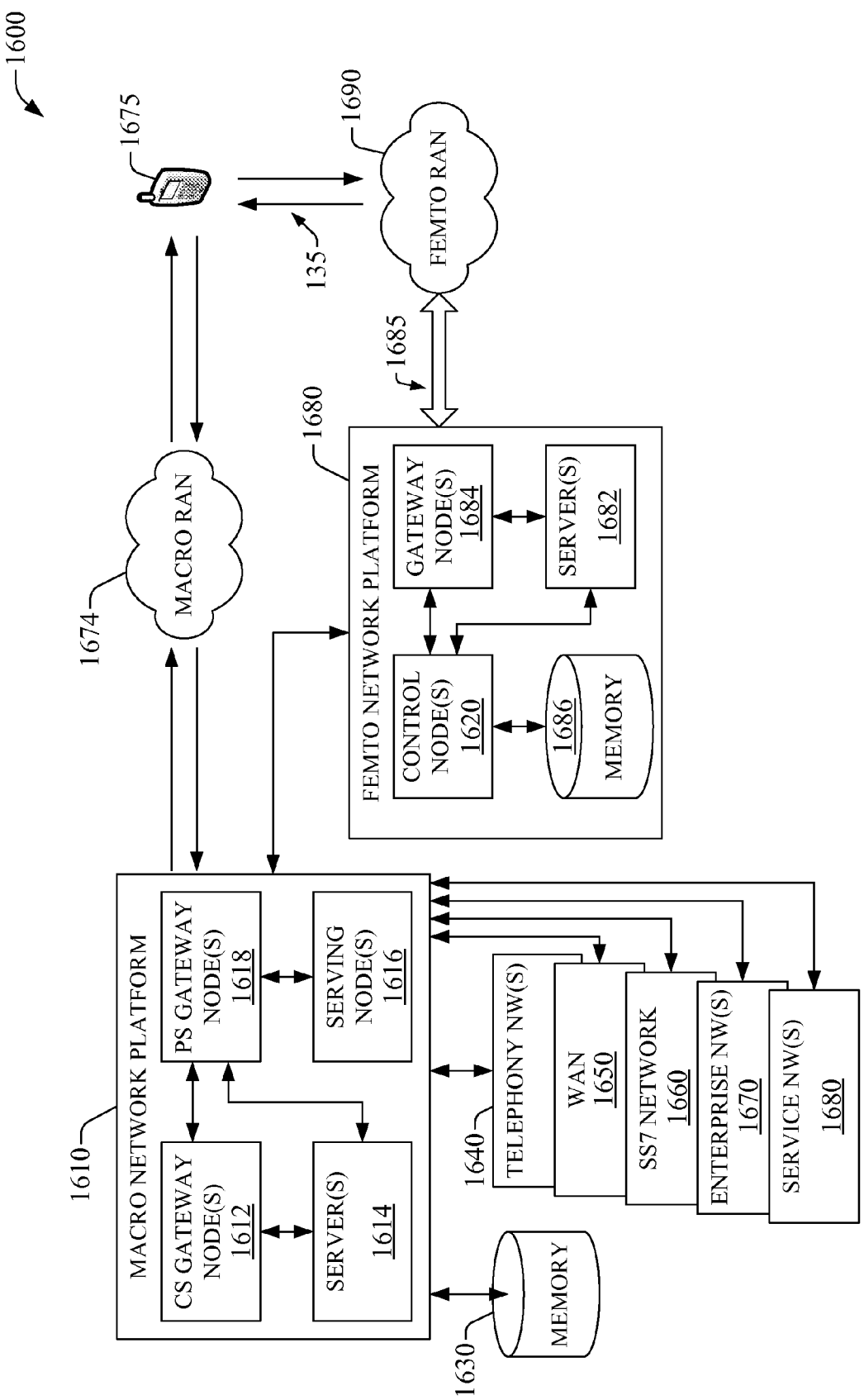
FIG. 16 is a block diagram of an example wireless network environment that includes macro and femto network platforms and can implement and exploit aspects or features described herein.

To provide further context for various aspects of the subject specification, FIG. 15 and FIG. 16 illustrate, respectively, a block diagram of an example embodiment 1500 of a femtocell access point that can enable or exploit features or aspects of the subject innovation, and example wireless network environment 1600 that includes femto and macro network platforms and that can enable or exploit aspects or features of the subject innovation described herein, and utilize femto APs that exploit aspects of the subject innovation in accordance with various aspects described herein.

In embodiment 1500, femto AP 1505 can receive and transmit signal(s) (e.g., attachment signaling) from and to wireless devices like femto access points, access terminals, wireless ports and routers, or the like, through a set of antennas 1520₁-1520_N (N is a positive integer). It should be appreciated that antennas 1520₁-1520_N embody antenna(s) component 217, and are a part of communication platform 1515, which comprises electronic components and associated circuitry that provides for processing and manipulation of received signal(s) and signal(s) to be transmitted. Such electronic components and circuitry embody at least in part signaling detection component 285; communication platform 1515 operates in substantially the same manner as communication platform 504 described hereinbefore. In an aspect, communication platform 1515 includes a receiver/transmitter 1516 that can convert signal from analog to digital upon reception, and from digital to analog upon transmission. In addition, receiver/transmitter 1516 can divide a single data stream into multiple, parallel data streams, or perform the reciprocal operation. Coupled to receiver/transmitter 1516 is a multiplexer/demultiplexer (mux/demux) component 1517 that facilitates manipulation of signal in time and frequency space. Electronic component 1517 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1517 can scramble and spread information (e.g., codes) according to substantially any code known in the art; e.g., Hadamard-Walsh codes, Baker codes, Kasami codes, polyphase codes, and so on. A modulator/demodulator (mod/demod) 1518 is also a part of communication platform 1515, and can modulate information according to multiple modulation techniques, such as frequency modulation, amplitude modulation (e.g., M-ary quadrature amplitude modulation (QAM), with M a positive integer), phase-shift keying (PSK), and the like Femto access point 1505 also includes processor(s) 1535 configured to confer, and that confers, at least in part, functionality to substantially any component platform or interface, and related circuitry in femto AP 1505. In particular, processor(s) 1535 can enable, at least part, configuration of femto AP 1505, via control node(s) 1510. In an aspect, control node(s) 1510 can provision or configure an identifier code such as SAC for femto AP 1505, wherein the identifier code can be retained in memory 1545. In another aspect, control node(s) 1510 can supply system messages that can be broadcasted via communication platform 1515. In yet another aspect, control node(s) 1510 can autonomously adjust, as dictated at least in part by handover component 254, transmitted power of pilot signal(s) delivered through communication platform 1515 to mitigate signaling among a mobile device that hands over from macrocell coverage to femto coverage served through femto AP 1505.

Additionally, femto AP 1505 includes display interface 1512, which can display functions that control functionality of femto AP 1505, or reveal operation conditions thereof. In addition, display interface 1512 can include a screen to convey information to an end user. In an aspect, display interface 1512 can be a liquid crystal display (LCD), a plasma panel, a monolithic thin-film based electrochromic display, and so on. Moreover, display interface can also include a component (e.g., speaker(s)) that facilitates communication of aural indicia, which can also be employed in connection with messages that convey operational instructions to an end user. Display interface 1512 also facilitates data entry (e.g., through a linked keypad or via touch gestures), which can facilitated femto AP 1505 to receive external commands (e.g., restart operation).

Broadband network interface facilitates connection of femto AP 1505 to femto network via backhaul link(s) 153 (not shown in FIG. 15), which enables incoming and outgoing data flow. Broadband network interface 1514 can be internal or external to femto AP 1505, and it can utilize display interface 1512 for end-user interaction and status information delivery.

In an aspect, femto AP 1505 includes power supply 1525, which can deliver to components or functional elements within femto AP 1505, and can regulate power output of wireless signal(s) emitted there from. In an aspect, power supply 1525 can attach to a conventional power grid and include one or more transformers to achieve power level(s) that can operate femto AP 1505 components, functional elements, and related circuitry. Additionally, power supply 1525 can include a rechargeable power component, e.g., a rechargeable battery, to ensure operation when femto AP 1505 is disconnected from the power grid.

Processor(s) 1535 also is functionally connected to communication platform 1515 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor(s) 1535 is functionally connected, via data, system, or address bus 1511, to display interface 1512 and broadband network interface 1514 to confer, at least in part functionality to each of such components.

Memory 1545 also can store data structures, code instructions and program modules, or substantially any type of software or firmware; system or device information; code sequences hypotheses, and modulation and multiplexing hypotheses; spreading and pilot transmission; femto AP floor plan configuration; and so on. Furthermore, memory 1545 also can retain content(s) (e.g., multimedia files, subscriber-generated data); security credentials (e.g., passwords, encryption keys, digital certificates, biometric reference indicators like voice recordings, iris patterns, fingerprints); or the like. It is noted that memory 1545 can be internal to femto AP 1505 and include removable and stationary memory elements, or it can be an offline memory that is external to the femto AP 1505 and is functionally coupled thereto through one or more links or interfaces, e.g., USB, general purpose interface bus (GPIB), IEEE 1394, or the like. As an example, an offline memory can be a memory within a server within a confined wireless environment served through femto AP 1505.

Processor(s) 1535 is functionally coupled, e.g., via a memory bus, to the memory 1545 in order to store and retrieve information necessary to operate and/or confer functionality to the components, platform, and interface that reside within femto access point 1505.

With respect to FIG. 16, wireless communication environment 1600 includes two wireless network platforms: (i) A macro network platform 1610 which serves, or facilitates communication with user equipment 1675 (e.g., mobile 120$_A$) via a macro radio access network (RAN) 1674. It should be appreciated that in cellular wireless technologies (e.g., 3GPP UMTS, HSPA, 3GPP LTE, 3GPP UMTS, 3GPP2 UMB), macro network platform 1610 is embodied in a Core Network. (ii) A femto network platform 1680, which can provide communication with UE 1675 through a femto RAN 1690, which is linked to the femto network platform 1680 via backhaul pipe(s) 1685 (e.g., backhaul link(s) 153). It should be appreciated that macro network platform 1610 typically hands off UE 1675 to femto network platform 1610 once UE 1675 attaches, e.g., through macro-to-femto handover as described herein, to femto RAN 1690, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 1674 can comprise various coverage cells like cells 105, while femto RAN 1690 can comprise multiple femtocell access points such as femto AP 130. Deployment density in femto RAN 1690 is substantially higher than in macro RAN 1674.

Generally, both macro and femto network platforms 1610 and 1680 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1610 includes CS gateway node(s) 1612 which can interface CS traffic received from legacy networks like telephony network(s) 1640 (e.g., public switched telephone network (PSTN), or public land mobile network (PLMN)) or a signaling system No. 7 (SS7) network 1660. Circuit switched gateway 1612 can authorize and authenticate traffic (e.g., voice) arising from such networks. Additionally, CS gateway 1612 can access mobility, or roaming, data generated through SS7 network 1660; for instance, mobility data stored in a VLR, which can reside in memory 1630. Moreover, CS gateway node(s) 1612 interfaces CS-based traffic and signaling and gateway node(s) 1618. As an example, in a 3GPP UMTS network, PS gateway node(s) 1618 can be embodied in gateway GPRS support node(s) (GGSN).

In addition to receiving and processing CS-switched traffic and signaling, PS gateway node(s) 1618 can authorize and authenticate PS-based data sessions with served (e.g., through macro RAN) wireless devices. Data sessions can include traffic exchange with networks external to the macro network platform 1610, like wide area network(s) (WANs) 1650, enterprise networks (NW(s)) 1670 (e.g., enhanced 911), or service NW(s) 1680 like IP multimedia subsystem; it should be appreciated that local area network(s) (LANs), which may be a part of enterprise NW(s), can also be interfaced with macro network platform 1610 through PS gateway node(s) 1618. Packet-switched gateway node(s) 1618 generates packet data contexts when a data session is established. To that end, in an aspect, PS gateway node(s) 1618 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1614. It is to be noted that in 3GPP UMTS network(s), PS gateway node(s) 1618 (e.g., GGSN) and tunnel interface (e.g., TTG) comprise a packet data gateway (PDG).

Macro network platform 1610 also includes serving node(s) 1616 that convey the various packetized flows of information, or data streams, received through PS gateway node(s) 1618. As an example, in a 3GPP UMTS network, serving node(s) can be embodied in serving GPRS support node(s) (SGSN).

As indicated above, server(s) 1614 in macro network platform 1610 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1610. Data streams can be conveyed to PS gateway node(s) 1618 for authorization/authentication and initiation of a data session, and to serving node(s) 1616 for communication thereafter. Server(s) 1614 also can effect security (e.g., implement one or more firewalls) of macro network platform 1610 to ensure network's operation and data integrity in addition to authorization and authentication procedures that CS gateway node(s) 1612 and PS gateway node(s) 1618 can enact. Moreover, server(s) 1614 can provision services from external network(s), e.g., WAN 1650, or Global Positioning System (GPS) or GNSS network(s), which can be a part of enterprise NW(s) 1680. It is to be noted that server(s) 1614 can include at least one of a memory, one or more processors configured to confer at least in part the functionality of macro network platform 1610, and a bus which can include a memory bus, a system bus, an address bus or one or more reference link(s). To that end, the one or more processor can execute code instructions (not shown) stored in memory 1630, for example.

In example wireless environment 1600, memory 1630 stores information related to operation of macro network platform 1610. Information can include business data associated with subscribers; market plans and strategies, e.g., promotional campaigns, business partnerships; operational data for mobile devices served through macro network platform; service and privacy policies; end-user service logs for law enforcement; and so forth. Memory 1630 can also store information from at least one of telephony network(s) (NW(s)) 1640, WAN 1650, SS7 network 1660, enterprise NW(s) 1670, or service NW(s) 1680.

Regarding femto network platform 1680, it includes a femto gateway node(s) 1684, which have substantially the same functionality as PS gateway node(s) 1618. Additionally, femto gateway node(s) 1684 can also include substantially all functionality of serving node(s) 1616. Disparate gateway node(s) 1684 can control or operate disparate sets of deployed femto APs, which can be a part of femto RAN 1690. In an aspect of the subject innovation, femto gateway node(s) 1684 can operate in substantially the same manner as gateway node(s) 242. Control node(s) 1620 can operate in substantially the same manner as control node(s) 253, and can be distributed at least in part across a plurality of femto access points that are part of RAN 1690.

Memory 1686 can retain additional information relevant to operation of the various components of femto network platform 1680. For example operational information that can be stored in memory 1686 can comprise, but is not limited to, subscriber intelligence; contracted services; maintenance and service records; femtocell configuration (e.g., devices served through femto RAN 1690; authorized subscribers associated with one or more deployed femto APs); service policies and specifications; privacy policies; add-on features; so forth.

Server(s) 1682 have substantially the same functionality as described in connection with server(s) 1614. In an aspect, server(s) 1682 can execute multiple application(s) that provide service (e.g., voice and data) to wireless devices served through femto RAN 1690. Server(s) 1682 can also provide security features to femto network platform. In addition, server(s) 1682 can manage (e.g., schedule, queue, format . . . ) substantially all packetized flows (e.g., IP-based, frame relay-based, ATM-based) it generates in addition to data received from macro network platform 1610. Furthermore, server(s) 1682 can effect provisioning of femtocell service, and effect operations and maintenance. It is to be noted that server(s) 1682 can include at least one of a memory, one or more processors configured to provide at least in part the functionality of femto network platform 1680, and a bus which can include a memory bus, a system bus, an address bus or one or more reference link(s). To that end, the one or more processors can execute code instructions (not shown) stored in memory 1686, for example.

It is noted that femto network platform 1680 and macro network platform 1610 can be functionally connected through one or more reference link(s) or reference interface(s). In addition, femto network platform 1680 can be functionally coupled directly (not illustrated) to one or more of external network(s) 1640-1680. Reference link(s) or interface(s) can functionally link at least one of gateway node(s) 1684 or server(s) 1682 to the one or more external networks 1640-1680.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a system comprising a processor, macro-to-femto transfer data from a mobile device, wherein the macro-to-femto transfer data identifies a virtual femto node that represents a set of femto access point devices;
   selecting, based on location estimate data associated with the mobile device, a first femto access point device from the set of femto access point devices that is closer to the mobile device than a second femto access point device of the set of femto access point devices;
   instructing, by the system, the mobile device to facilitate a transfer from a macro cell to a femto cell associated with the first femto access point device in response to the selecting; and
   instructing, by the system, the mobile device to scan a channel quality associated with a subset of the set of femto access point devices that is determined as a function of a configuration of a set of access privileges assigned to the set of femto access point devices based on a set of service area codes associated with the set of femto access point devices, wherein the set of service area codes are determined based on a scan of a set of pilot signals by the mobile device.

2. The method of claim 1, further comprising:
   instructing, by the system, the first femto access point device to prepare for the transfer.

3. The method of claim 1, further comprising:
   receiving, by the system, the location estimate data from the mobile device subsequent to a global navigation satellite system measurement.

4. The method of claim 3, wherein the receiving includes receiving the location estimate data in response to determining that the mobile device is enabled with a global positioning system service.

5. The method of claim 1, further comprising:
   determining, by the system, the location estimate data based on time-of-flight measurements of propagation timing of wireless signals from the mobile device.

6. The method of claim 5, wherein the determining includes determining the location estimate data in response to determining that the mobile device is not enabled with a global positioning system service.

7. The method of claim 1, wherein the femto cell includes a first femto cell, and the method further comprises:
   determining, by the system, that a request associated with the transfer is denied; and
   selecting, by the system, a third femto access point device of the set of femto access point devices based on the location estimate data in response to the determining.

8. The method of claim 7, wherein the transfer is a first transfer and the method further comprises:
   instructing, by the system, the mobile device to facilitate a second transfer from the macro cell to a second femto cell associated with the third femto access point device in response to the selecting the third femto access point device.

9. The method of claim 1, further comprising:
   verifying, by the system, that identifier data associated with the mobile device is included in access data linked to the first femto access point device; and
   in response to the identifier data being included in the access data, accepting, by the system, a macro-to-femto transfer request and preparing, by the system, for the transfer.

10. The method of claim 9, wherein the preparing includes:
    receiving data directed to the mobile device;
    reserving a radio resource including communication bandwidth associated with the mobile device;
    adjusting a semi-persistent scheduling parameter;
    configuring a transceiver and associated communication circuitry to operate in a radio technology in which the mobile device operates; and
    augmenting, for a predefined time period, a pilot signal transmitted power associated with the first femto access point device.

11. The method of claim 9, further comprising:
    authorizing, by the system, the transfer in response to determining that the mobile device is authorized to connect to the first femto access point device.

12. The method of claim 11, further comprising:
    facilitating, by the system, routing of traffic intended for the mobile device to a macro-to-femto transfer connection.

13. A system, comprising:
    a memory to store computer-executable instructions; and
    a processor, communicatively coupled to the memory, that facilitates execution of the computer-executable instructions to perform operations comprising:
    receiving, from a mobile device, neighbor data associated with a macro-to-femto transfer, wherein the neighbor data includes a virtual femto node that represents a set of femto access point devices;
    selecting, based on location estimate data for the mobile device, a first femto access point device from the set of femto access point devices that is closer to the mobile device than a second femto access point device of the set of femto access point devices, subsequent to the selecting, facilitating a transmission of a directive to the mobile device to facilitate a transfer from a macro cell to the first femto access point device; and directing an instruction to the mobile device to scan a channel quality associated with a subset of the set of femto access point devices, wherein the subset of the set of femto access point devices is determined based on a configuration of a set of access privileges to the set of femto access point devices in accordance with a set of service area codes associated with the set of femto access point devices and wherein the set of service area codes are determined based on a scan of a set of pilot signals by the mobile device.

14. The system of claim 13, wherein the operations further comprise: directing a macro-to-femto transfer request to a femto network platform device.

15. The system of claim 14, wherein the operations further comprise: facilitating routing of data directed to the mobile device to a configured macro-to-femto transfer connection in response to a determination that the macro-to-femto transfer request is being accepted.

16. The system of claim 13, wherein the operations further comprise:
requesting the mobile device to transmit global navigation satellite system-based location estimate data.

17. The system of claim 13, wherein the operations further comprise:
determining time-of-flight measurement data indicative of propagation timing of wireless signals between a macro serving base station device and the mobile device to facilitate a determination of the location estimate data.

18. The system of claim 17, wherein the operations further comprise:
determining the location estimate data based on round trip time measurement data associated with a wireless communication of the mobile device.

19. The system of claim 17, wherein the operations further comprise:
determining the location estimate data based on angle of arrival measurement data associated with a wireless communication of the mobile device.

20. The system of claim 19, wherein the operations further comprise:
determining the set of the service area codes.

21. The system of claim 20, wherein the operations further comprise:
determining that the mobile device is authorized to connect with the first femto access point device based on a service area code of the set of service area codes associated with the first femto access point device.

22. The system of claim 13, wherein the operations further comprise:
facilitating an authorization of the transfer to the first femto access point device in response to a determination that the mobile device is authorized to connect to the first femto access point device.

23. The system of claim 22, wherein the operations further comprise:
facilitating routing of data intended for the mobile device to a macro-to-femto transfer connection in response to the determination.

24. The system of claim 13, wherein the first femto access point device is selected from the set of femto access point devices based in part on identifier data associated with the mobile device.

25. A method, comprising:
facilitating, by a system comprising a processor, reporting of virtual femto node data in transfer neighbor data from a wireless device to a network node, wherein the virtual femto node represents a set of femto access point devices;

determining, by the system, a subset of the set of femto access point devices based on an access privilege associated with the wireless device, wherein the access privilege is determined based on identifying respective service area codes for the set of femto access point devices as a function of scanning respective pilot signals from the set of femto access point devices; and determining, by the system, channel quality data associated with the subset of the set of femto access point devices.

26. The method of claim 25, further comprising:
receiving, by the system, an indication to deliver time-of-flight signaling data indicative of a measurement of timing propagation of a wireless signal between the wireless device and a serving macrocell; and facilitating, by the system, delivery of the time-of-flight signaling data to a network device.

27. The method of claim 25, further comprising:
receiving, by the system, a command to communicatively couple to a specified femto access point device that is selected from the set of femto access point devices based on a comparison of distances between the wireless device and the set of femto access point devices.

28. The method of claim 27, further comprising:
facilitating, by the system, communicatively coupling to the specified femto access point device; and facilitating, by the system, disconnection from a serving macro base station device.

29. The method of claim 27, wherein the receiving the command includes receiving the command in response to determining that the specified femto access point device is located within a preconfigured range from the wireless device.

30. The method of claim 25, further comprising:
determining, by the system, target femtocell data in accordance with the channel quality data.

31. A mobile device, comprising:
a memory to store computer-executable instructions; and
a processor, communicatively coupled to the memory, that facilitates execution of the computer-executable instructions to perform operations comprising:
facilitating a transmission of transfer neighbor data that includes virtual femto node data indicative of a set of femto access point devices;

determining access privilege data associated with a wireless device based on identifying respective service area codes for the set of femto access point devices as a function of scanning respective pilot signals from the set of femto access point devices; and determining channel quality data associated with a subset of the set of femto access point devices, wherein the subset of the set of femto access point devices is selected based on the access privilege data.

32. The mobile device of claim 31, wherein the operations further comprise:
storing access data that facilitates determination of the access privilege data.

33. The mobile device of claim 31, wherein the operations further comprise:
receiving an instruction to transfer a communication associated with the mobile device to an identified femto access point device that is selected from the set of femto access point devices based on comparing the distances between the mobile device and the set of femto access point devices.

34. The mobile device of claim 33, wherein the operations further comprise:
measuring a pilot signal associated with the femto access point device in response to determining that the mobile device is allowed to access the identified femto access point device.

35. The mobile device of claim 33, wherein the operations further comprise: directing a request to transfer the communication to the identified femto access point device.

36. The mobile device of claim 33, wherein the operations further comprise: facilitating communicatively coupling the mobile device to the identified femto access point device and disconnecting the mobile device from a service macro base station device in response to receiving the instruction.

37. The mobile device of claim 33, wherein the receiving the instruction includes receiving the instruction to transfer the communication to the identified femto access point device in response to determining that the identified femto access point device is located within a preconfigured range from the mobile device.

38. The mobile device of claim 31, wherein the determining the channel quality data includes determining the channel quality data in response to determining that the mobile device is allowed to access the subset of the set of femto access point devices.

\* \* \* \* \*